(12) United States Patent
Kimoto et al.

(10) Patent No.: US 12,037,044 B2
(45) Date of Patent: Jul. 16, 2024

(54) LOWER VEHICLE BODY STRUCTURE

(71) Applicant: NIPPON STEEL CORPORATION, Tokyo (JP)

(72) Inventors: Naoki Kimoto, Tokyo (JP); Takeshi Kawachi, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 169 days.

(21) Appl. No.: 17/435,638

(22) PCT Filed: Mar. 4, 2020

(86) PCT No.: PCT/JP2020/009258
§ 371 (c)(1),
(2) Date: Sep. 1, 2021

(87) PCT Pub. No.: WO2020/184349
PCT Pub. Date: Sep. 17, 2020

(65) Prior Publication Data
US 2022/0153349 A1    May 19, 2022

(30) Foreign Application Priority Data
Mar. 8, 2019  (JP) .................................. 2019-042634

(51) Int. Cl.
*B62D 21/11*    (2006.01)
*B60K 1/04*    (2019.01)
*B60K 17/16*    (2006.01)

(52) U.S. Cl.
CPC ................ *B62D 21/11* (2013.01); *B60K 1/04* (2013.01); *B60K 17/16* (2013.01)

(58) Field of Classification Search
CPC ........ B62D 21/11; B62D 21/06; B62D 21/08; B62D 21/00; B60K 1/04; B60K 17/16
See application file for complete search history.

(56) References Cited

U.S. PATENT DOCUMENTS

| | | |
|---|---|---|
| 2007/0108802 A1 | 5/2007 | Gunther et al. |
| 2010/0102543 A1 | 4/2010 | Kang |
| 2014/0125030 A1 | 5/2014 | Hara |
| 2015/0021115 A1 | 1/2015 | Komiya |

(Continued)

FOREIGN PATENT DOCUMENTS

| | | | |
|---|---|---|---|
| CN | 103802890 A | * 11/2013 | |
| CN | 103802890 A | * 5/2014 | ............. B62D 21/11 |

(Continued)

*Primary Examiner* — James A Shriver, II
*Assistant Examiner* — Nicholas R. Kandas
(74) *Attorney, Agent, or Firm* — Birch, Stewart, Kolasch & Birch, LLP

(57) ABSTRACT

This lower vehicle body structure includes: suspension components; a cross member including a pair of part cross members connected to the suspension components, and a reinforcing part coaxially connected between the pair of part cross members; a plurality of body mounts; and a plurality of connection members directly connecting each of the plurality of body mounts and the reinforcing part. A minimum sheet thickness of the reinforcing part at connection positions with respect to the pair of part cross members is 1.6 times or more an average sheet thickness at connection ends of the pair of part cross members with respect to the reinforcing part.

18 Claims, 19 Drawing Sheets

(56) References Cited

U.S. PATENT DOCUMENTS

| | | |
|---|---|---|
| 2018/0037263 A1 | 2/2018 | Kanasugi |
| 2018/0105213 A1* | 4/2018 | Kagami .................. B62D 21/11 |
| 2018/0222277 A1* | 8/2018 | Kiehn .................... B62D 21/11 |
| 2019/0185059 A1* | 6/2019 | Iimi |

FOREIGN PATENT DOCUMENTS

| | | |
|---|---|---|
| CN | 204548233 U | 8/2015 |
| JP | 2009-61879 A | 3/2009 |
| JP | 2010-100275 A | 5/2010 |
| JP | 2013-159223 A | 8/2013 |
| JP | 2014-94588 A | 5/2014 |
| JP | 2018-70039 A | 5/2018 |
| KR | 101736622 B1 * | 5/2017 |
| WO | WO 2013/145549 A1 | 10/2013 |
| WO | WO 2018/016051 A1 | 1/2018 |

* cited by examiner

US 12,037,044 B2

LOWER VEHICLE BODY STRUCTURE

TECHNICAL FIELD

The present invention relates to a lower vehicle body structure.

Priority is claimed on Japanese Patent Application No. 2019-042634 filed in Japan on Mar. 8, 2019, the content of which is incorporated herein by reference.

BACKGROUND ART

Automobiles include a lower vehicle body structure for supporting suspension components such as arm components and a steering mechanism at a lower portion of the vehicle body of the automobile. A subframe as exemplified, for example, in Patent Document 1 cited below is provided in the lower vehicle body structure. A subframe requires stiffness as a design requirement. Specifically, in addition to stiffness to support a weight of each component such as a rack gear, a sufficient stiffness that also can withstand a lateral force applied from arm components during cornering of the automobile and a longitudinal force applied from the arm components when the automobile accelerates or decelerates is required.

It is also conceivable to simply increase a sheet thickness of a subframe to increase the stiffness, but in that case, there is a concern that a weight of the subframe itself will increase and fuel efficiency will deteriorate. Generally, since improvement in mechanical strength and weight reduction are in a contradictory relationship, compatibility of these is not easy.

For example, Patent Document 2 discloses a front vehicle body structure including a pair of left and right lower arms that support front wheels, a first transverse member that connects between support parts on a rear side of the left and right lower arms in the vehicle body, a second transverse member that connects between portions on a front end side of a pair of left and right rockers, and a coupling structure that integrally couples the first transverse member and the second transverse member.

According to this front vehicle body structure, a strength against a collision load that is input backward via the front wheels at the time of a fine lap collision can be secured while curbing increase in mass of the vehicle body.

In addition, Patent Document 3 to 6 also disclose lower vehicle body structures of various types.

CITATION LIST

Patent Document

[Patent Document 1]
  Japanese Unexamined Patent Application, First Publication No. 2010-100275
[Patent Document 2]
  Japanese Unexamined Patent Application, First Publication No. 2014-94588
[Patent Document 3]
  Japanese Unexamined Patent Application, First Publication No. 2013-159223
[Patent Document 4]
  PCT International Publication No. WO 2013/145549
[Patent Document 5]
  Japanese Unexamined Patent Application, First Publication No. 2009-61879
[Patent Document 6]
  PCT International Publication No. WO 2018/016501

SUMMARY OF THE INVENTION

Problems to be Solved by the Invention

However, the front vehicle body structure described in Patent Document 2 has a structure in which a longitudinal force generated in accordance with a behavior of the automobile is received by a joint part on an upper surface of a front cross (cross member). That is, a brace that transmits a longitudinal force is joined to the upper surface of the front cross, and a point of application of the longitudinal force due to the brace is significantly deviated in a vertical direction with respect to a central axis of the front cross. Since this large deviation causes a bending moment that twists the front cross that receives a longitudinal force around a central axis thereof, there is a high likelihood of adversely affecting a load transmission efficiency when an input is transmitted to the front cross.

On the other hand, in a case of Patent Document 1 cited above, at the time of a head-on collision of the vehicle, a mount bolt may come off from a second hole of the frame structure so that a reinforcing effect of the vehicle body structure of the frame structure is lost and thereby deceleration of the vehicle body is reduced. That is, the purpose is to actively lose the reinforcing effect at the time of a head-on collision and improvement in stiffness is not intended.

Also, in the lower vehicle body structure of Patent Document 3, a configuration in which a bent part of a brace member is connected to a center cross member is employed. However, there is still room for improvement in stiffness of the connection structure between the center cross member and the brace member such as the connection position in a plan view being far away from an axis of the center cross member.

The front subframe structure of Patent Document 4, the vehicle body suspension device of Patent Document 5, and the vehicle body frame described in Patent Document 6 still have problems from the perspective of improving stiffness for the same reason as in Patent Document 3 described above.

The present invention has been made in view of the above circumstances, and an objective thereof is to provide a lower vehicle body structure that is lightweight and has high stiffness and a high load transmission efficiency.

Means for Solving the Problem

In order to solve the above-described problems and achieve the objective, the present invention employs the following measures.

(1) A lower vehicle body structure according to one aspect of the present invention includes: suspension components; a cross member including a pair of part cross members connected to the suspension components and a reinforcing part coaxially connected between the pair of part cross members; a plurality of body mounts; and a plurality of connection members directly connecting each of the plurality of body mounts and the reinforcing part, wherein a minimum sheet thickness of the reinforcing part at connection positions with respect to the pair of part cross members is 1.6 times or more an average sheet thickness at connection ends of the pair of part cross members with respect to the reinforcing part.

According to the lower vehicle body structure of the above-described (1), a lateral force in a longitudinal direction of the cross member and a longitudinal force perpendicular to the longitudinal direction are applied to the cross member from the suspension components. Of these, the cross member receives the lateral force as a compressive axial force or a tensile axial force in a direction in which the cross member extends. Therefore, higher stiffness can be secured than that when the lateral force is received by bending of the cross member. In addition, the cross member is supported by the plurality of body mounts via the plurality of connection members. Therefore, the longitudinal force applied to the cross member can be transmitted to the plurality of body mounts with a high load transmission efficiency.

Here, since the minimum sheet thickness of the reinforcing part is set to 1.6 times or more the average sheet thickness at the connection ends of the part cross members, a bending stiffness of a wall portion of the reinforcing part at the connection positions with respect to the part cross members can be increased to four times or more a bending stiffness of the part cross members. Since the lateral force and the longitudinal force applied to the cross member are transmitted to the body mounts by interposing the reinforcing part having such high bending stiffness, a high load transmission efficiency can be obtained. Moreover, stiffness at portions joining to the connection members can be particularly increased in the entire cross member. Therefore, lightness in weight is achieved compared to a case in which a sheet thickness and a cross-sectional dimension are increased over the entire length of the cross member to increase stiffness.

(2) In the case of the above-described (1), the following configuration may be employed: the connection end at one of the pair of part cross members is abutted and connected to a first wall surface of the reinforcing part; the connection end at the other of the pair of part cross members is abutted and connected to a second wall surface of the reinforcing part; and one of the part cross members, the first wall surface, the second wall surface, and the other of the part cross members are coaxially aligned in that order in a longitudinal direction of the cross member.

According to the lower vehicle body structure of the above-described (2), a lateral force applied to one of the part cross members from the suspension component can be efficiently received as an axial force toward the other of the part cross members via the reinforcing part. Similarly, a lateral force applied to the other of the part cross members from the suspension component can also be efficiently received as an axial force toward one of the part cross members via the reinforcing part.

(3) In the case of the above-described (1) or (2), the following configuration may be employed: the plurality of connection members include a first connection member and a second connection member; and, in a longitudinal section perpendicular to the longitudinal direction of the cross member, which includes a position where an extended line of a first axis passing through a centroid of an outer shape at any position in a longitudinal direction of the first connection member in a cross section perpendicular to the longitudinal direction, and an extended line of a second axis passing through a centroid of an outer shape at any position in a longitudinal direction of the second connection member intersect in a plan view, both the extended line of the first axis and the extended line of the second axis are inside the reinforcing part.

According to the lower vehicle body structure of the above-described (3), the cross member is supported by the plurality of body mounts via the appropriately disposed first connection member and second connection member. Therefore, a longitudinal force applied to the cross member can be transmitted to the plurality of body mounts with a high load transmission efficiency.

Further, the above-described "inside the reinforcing part" refers to the inside of a range defined by outer shape lines when the reinforcing part is viewed in a longitudinal section. However, the above-described outer shape lines include not only a case in which all of them are connected to form a closed cross section but also a case in which some of them are not connected to form an open cross section. In a case of an open cross section, when end portions of outer shape lines positioned on both sides of a missing outer shape line are connected to each other with a virtual straight line to form a closed outer shape, this closed outer shape can be referred to as the "inside the reinforcing part."

(4) In the case of the above-described (3), the extended line of the first axis and the extended line of the second axis may coincide with each other at one point in the reinforcing part in a view of the longitudinal section.

In the case of the above-described (4), a longitudinal force applied to the cross member can be transmitted to the body mounts with a higher load transmission efficiency.

(5) In the lower vehicle body structure according to the above-described (4), both the extended line of the first axis and the extended line of the second axis may be inside a projected outer shape of the connection end of each of the pair of part cross members in a view of the longitudinal section.

In the case of the above-described (5), a longitudinal force applied to the cross member can be transmitted to the plurality of body mounts with a higher load transmission efficiency.

(6) In the lower vehicle body structure according to any one of the above-described (3) to (5), the first connection member may be joined to one of the body mounts via a first extension piece extending from an end portion of the first connection member.

In the case of the above-described (6), since surface-joining is performed via the first extension piece, a higher joining strength can be obtained than that when abutting joining is simply performed.

(7) In the lower vehicle body structure according to any one of the above-described (3) to (6), the second connection member may be joined to another of the body mounts via a second extension piece extending from an end portion of the second connection member.

In the case of the above-described (7), since surface-joining is performed via the second extension piece, a higher joining strength can be obtained than that when abutting joining is simply performed.

(8) In the lower vehicle body structure according to any one of the above-described (1) to (7), the reinforcing part may be a rack gear mount, another body mount, a differential gear mount, a motor mount, a battery mount, or any combination thereof.

In the case of the above-described (8), the reinforcing part can be formed without using an additional component.

(9) In the lower vehicle body structure according to the above-described (1) to (8), the following configuration may be employed: the reinforcing part is any one of the rack gear mount, the body mount, the differential gear mount, the motor mount, and the battery mount, each of which having a cylindrical shape; and the pair of part cross members and the plurality of connection members are abutted and connected to an outer circumferential surface of the reinforcing part.

In the case of the above-described (9), the reinforcing part has a cylindrical shape having a high mechanical strength, and since an outer circumferential surface thereof receives an external force from the part cross members and the connection members, a higher load transmission efficiency can be obtained.

(10) In the lower vehicle body structure according to any one of the above-described (1) to (9), a virtual straight line connecting centroids of outer shapes in a cross section perpendicular to the longitudinal direction of the cross member at positions of both ends of the cross member may pass through the inside of the cross member at any position in the longitudinal direction of the cross member.

In the case of the above-described (10), since a degree of linearity of the cross member is increased, the stiffness against a lateral force is higher than that in a case of a shape having a large curvature. Further, the outer shape at each position of both ends of the cross member is not limited only to a case of an outer shape closed by connecting all the outer shape lines but also includes a case of an outer shape that is open without some of the outer shape lines (for example, U-shape or the like). In a case of the open outer shape, it is preferable to connect end portions of outer shape lines positioned on both sides of a missing outer shape line to each other with a virtual straight line to form a closed outer shape, and then obtain a centroid on the basis of this closed outer shape.

Effects of the Invention

According to the above-described aspects, a lower vehicle body structure that is lightweight and has high stiffness and a high load transmission efficiency can be provided.

BRIEF DESCRIPTION OF DRAWINGS

FIGS. 10(a) and 10(b) are views illustrating a main part of the front subframe, in which FIG. 10(a) is an enlarged view of a portion D in FIG. 3, and FIG. 10(b) is a longitudinal sectional view along line E-E of FIG. 10(a).

EMBODIMENT FOR IMPLEMENTING THE INVENTION

Figure 1:
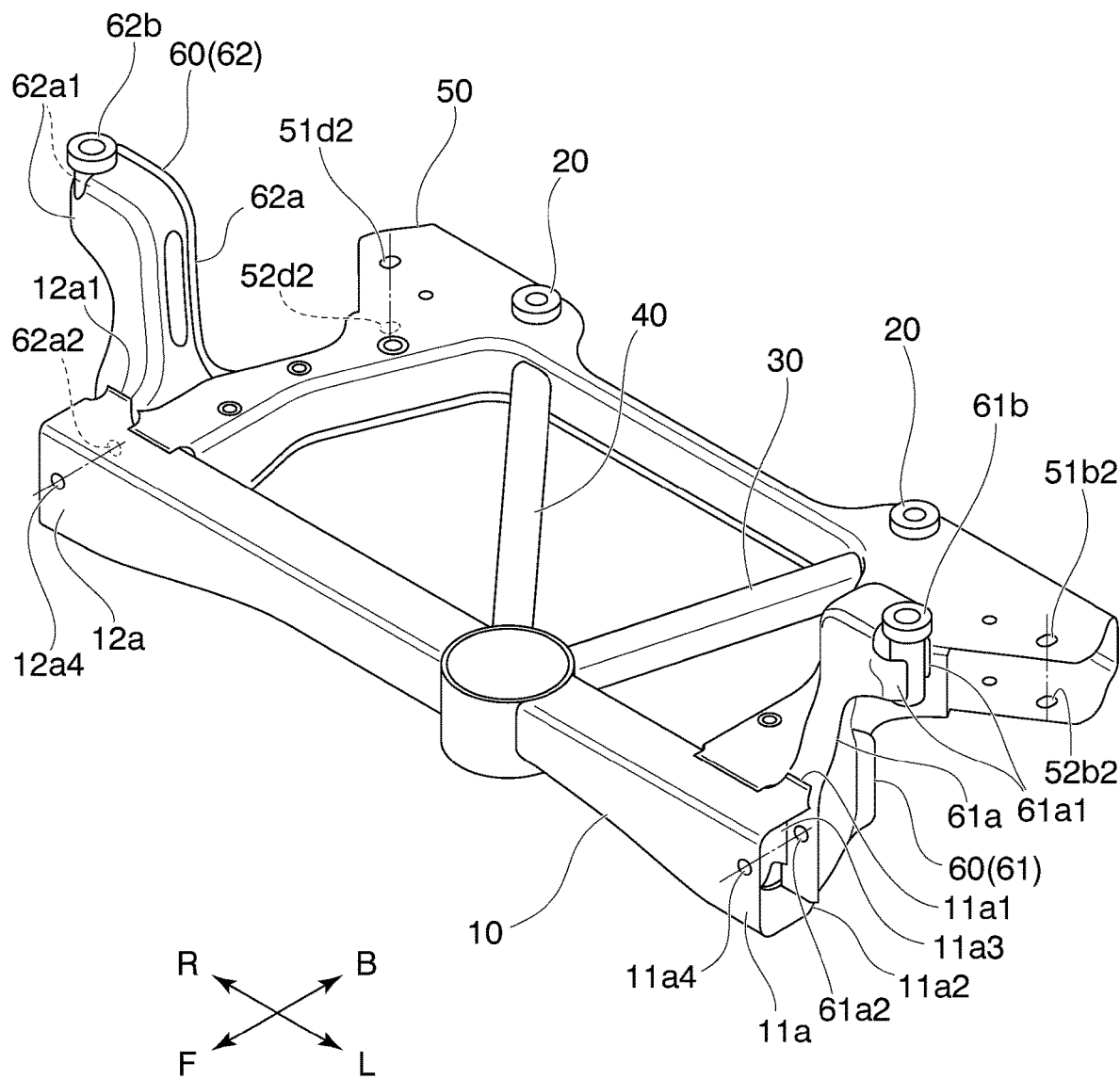
FIG. 1 is a perspective view of a front subframe provided in a lower vehicle body structure according to one embodiment of the present invention.

One embodiment of a lower vehicle body structure of the present invention will be described below.

The lower vehicle body structure of the present embodiment includes a pair of lower arms (suspension components) and a subframe that supports these lower arms at a lower portion of a vehicle body of an automobile. In the following description, a front subframe disposed on a front side of a lower portion of the vehicle body will be exemplified as the subframe. Also, in the following description, a front side in a traveling direction of the vehicle body is referred to as a forward side, a back side is referred to as a rearward side, and a vehicle width direction is referred to as a left-right direction in some cases. Also, in the drawings, a forward side as viewed from the vehicle body is indicated by an arrow F, a rearward side is indicated by an arrow B, a left direction is indicated by an arrow L, and a right side is indicated by an arrow R in some cases.

Figure 2:
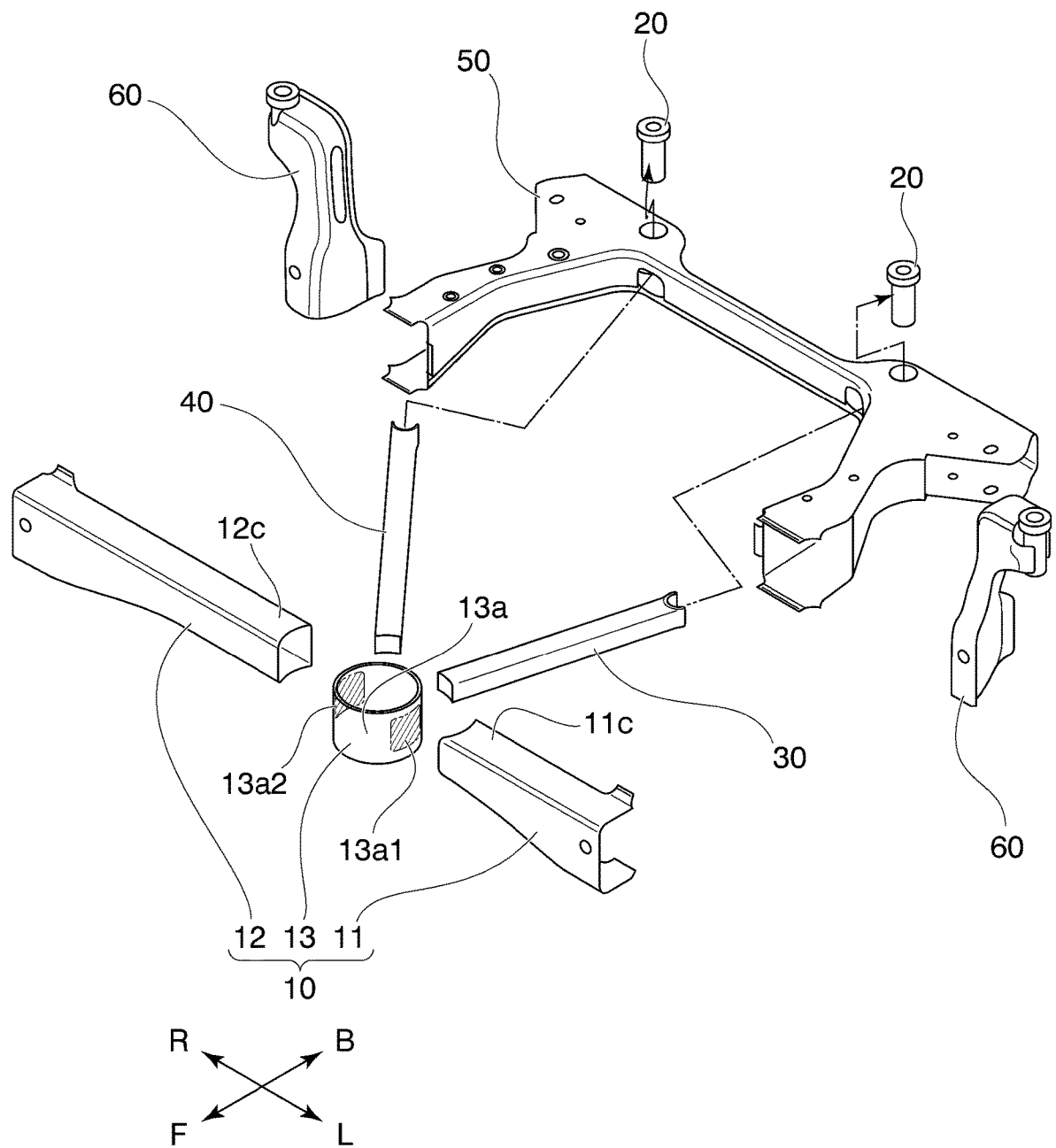
FIG. 2 is an exploded perspective view of the front subframe.
Figure 3:
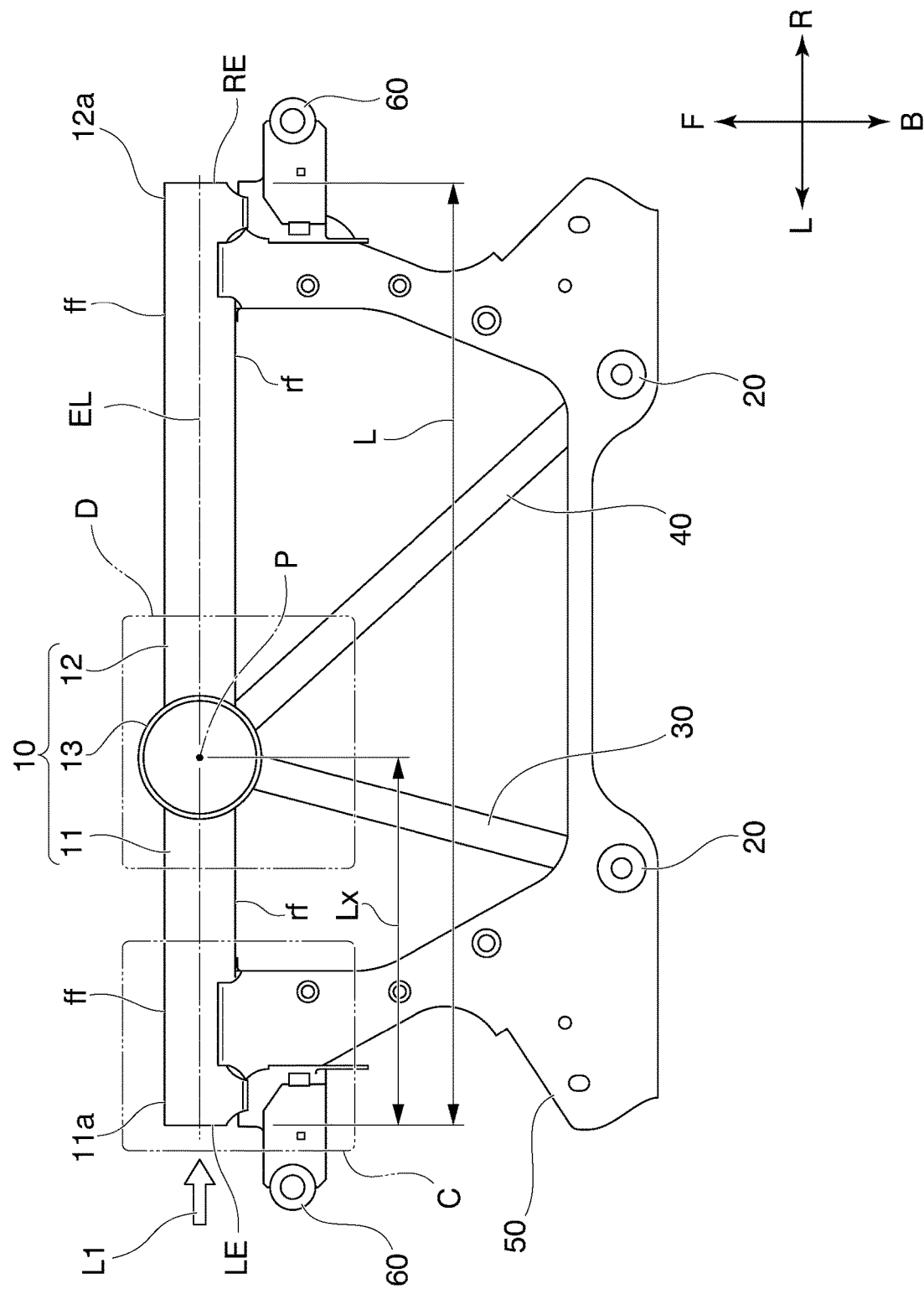
FIG. 3 is a plan view of the front subframe.

As illustrated in FIGS. 1 to 3, a front subframe of the present embodiment includes a front cross member 10 having both ends connected to the lower arms (not illustrated), a pair of rear body mounts (body mounts) 20 disposed to be spaced apart from each other in a left-right direction at positions on a rearward side relative to the front cross member 10, a pair of connection members (a first connection member and a second connection member) 30 and 40 connecting the front cross member 10 and each of the rear body mounts 20, a rectangular rear member 50 that holds the rear body mounts 20 and is joined to both ends of the front cross member 10, and a pair of front body mounts 60 joined to both the front cross member 10 and the rear member 50. Here, the lower arms are an example of suspension components. As suspension components connected to the front subframe, arm components such as upper arms, link components, or the like can be exemplified.

Figure 4:
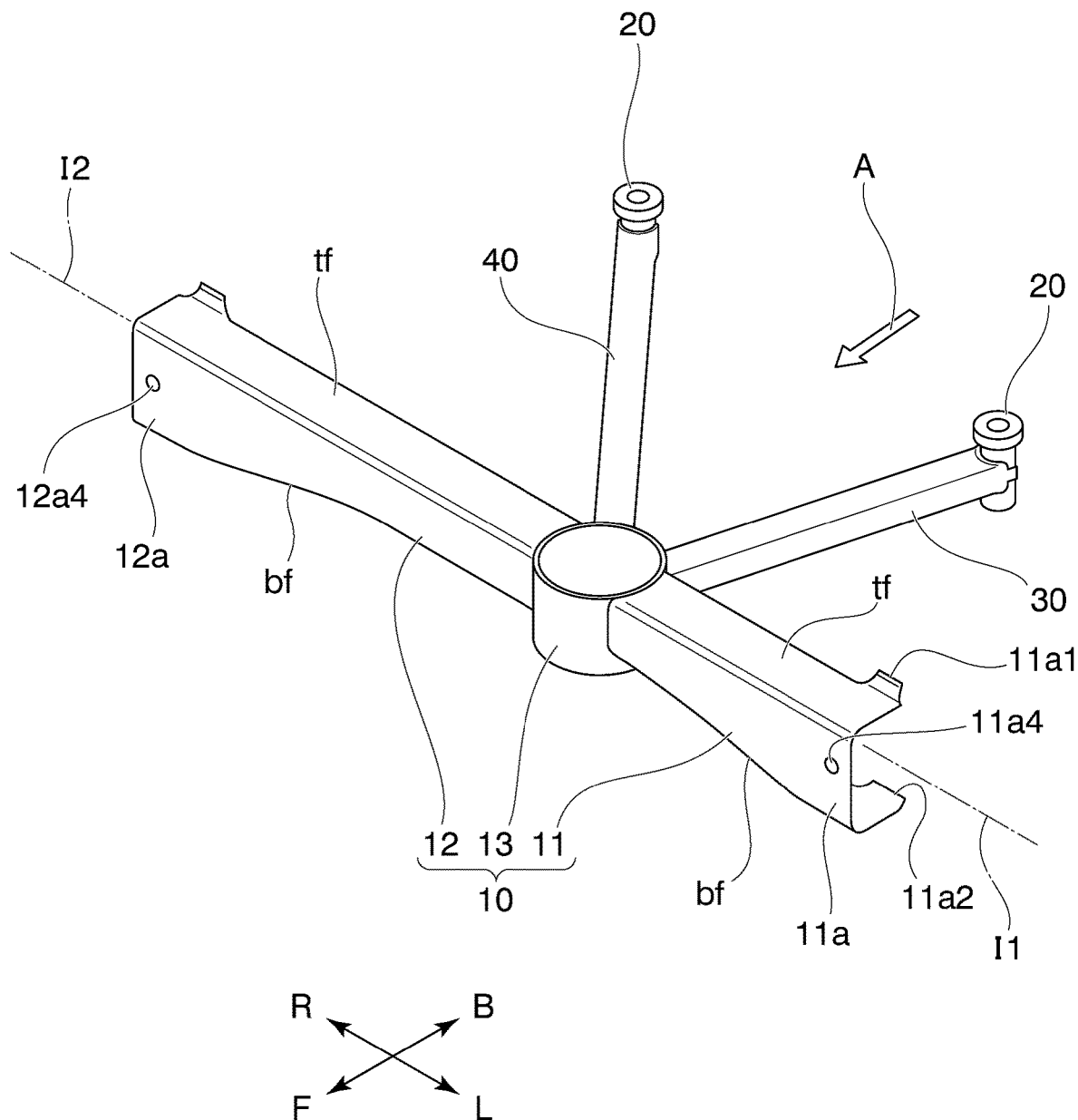
FIG. 4 is a perspective view illustrating a connection relationship of a front cross member with a first connection member and a second connection member in the front subframe.
Figure 5:
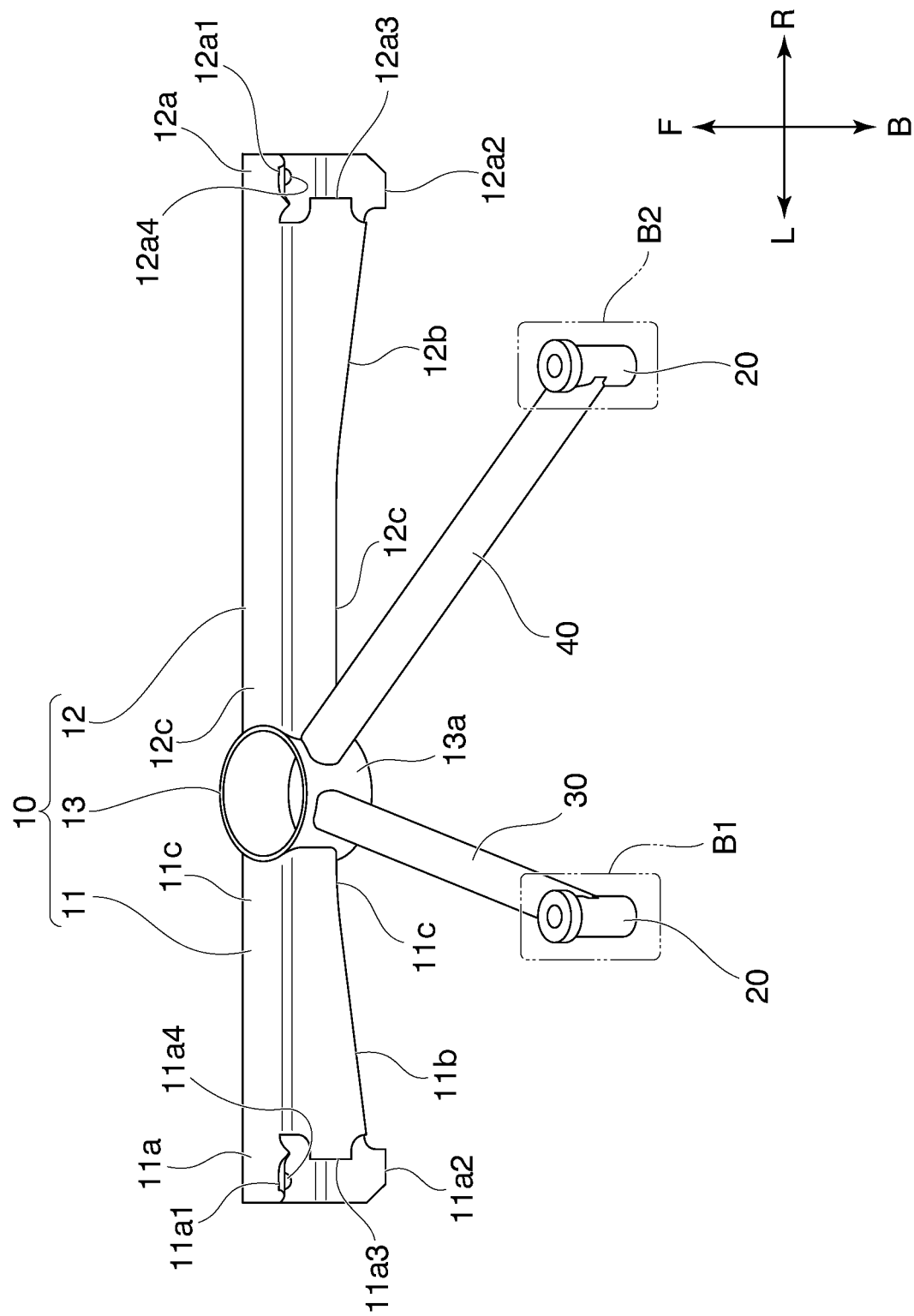
FIG. 5 is a perspective view illustrating a connection relationship of the front cross member with the first connection member and the second connection member in the front subframe when viewed from a direction A of FIG. 4.

As illustrated in FIGS. 4 and 5, the front cross member 10 (cross member) is a skeleton member extending in the left-right direction. The front cross member 10 includes a first part member (part cross member) 11 positioned on one side (left side) in an extending direction of the front cross member 10, a second part member 12 positioned on the other side (right side), and an engine mount 13 coaxially connecting the first part member 11 and the second part member (part cross member) 12. As described above, the front cross member 10 includes the first part member 11 and the second part member 12 which are coaxially disposed with the engine mount 13 sandwiched therebetween.

The first part member 11 is a tube member. As illustrated in FIG. 5, the first part member 11 includes a left end 11*a* whose cross-sectional shape is constant in the above-described extending direction, a tapered part 11*b* that is continuous with the left end 11*a* and in which the cross-sectional shape described above gradually decreases in size in a direction away from the left end 11*a*, and a straight part 11*c* that is continuous with the tapered part 11*b* and in which the cross-sectional shape described above is constant in the above-described extending direction. As illustrated in FIG. 2, a cross-sectional shape perpendicular to the extending direction of the first part member 11 is substantially rectangular, but such a cross-sectional shape is not limited to a rectangle, and may be, for example, circular, elliptical, or polygonal. Furthermore, when it is polygonal, a corner portion thereof may either have a ridge line or have an arc-shaped surface. Also, the first part member 11 may not have a tapered shape as illustrated in FIG. 5 and may be formed by a tube member whose cross-sectional shape at any position in the extending direction is substantially constant. That is, a shape of the first part member 11 is not particularly limited.

The second part member 12 is a tube member whose cross-sectional shape perpendicular to an extending direction thereof is substantially rectangular. As illustrated in FIG. 5, the second part member 12 includes a right end 12*a* in which the above-described cross-sectional shape is constant in the above-described extending direction, a tapered part 12*b* that is continuous with the right end 12*a* and in which the above-described cross-sectional shape gradually decreases in size in a direction away from the right end 12*a*, and a straight part 12*c* that is continuous with the tapered part 12*b* and in which the above-described cross-sectional shape is constant in the above-described extending direction. As illustrated in FIG. 2, a cross-sectional shape perpendicular to an extending direction of the second part member 12 is substantially a rectangular shape, but such a cross-sectional shape is not limited only to a rectangular shape, and may be, for example, a circular shape, an elliptical shape, or a polygonal shape. Furthermore, in a case of a polygonal shape, a corner portion thereof may either have a ridge line or have an arc-shaped surface. Also, the second part member 12 may not have a tapered shape as illustrated in FIG. 5 and may be formed by a tube member whose cross-sectional shape at any position in the extending direction is substantially constant. That is, a shape of the second part member 12 is not particularly limited.

The engine mount 13 is a component that supports an engine mounted on the vehicle body. The engine mount 13 is a cylinder having an axis in a vertical direction, and a cross-sectional shape thereof perpendicular to the axis is the same at any position in the axis. That is, the engine mount 13 has substantially the same outer diameter dimensions, inner diameter dimensions, and sheet thickness at any position in the axial direction thereof. The engine mount 13 is coaxially connected to an intermediate position of the front cross member 10 in the longitudinal direction.

As illustrated in FIGS. 2 and 5, the straight part (connection end) 11*c* of the first part member 11 is welded and fixed to a first wall surface 13*a*1 of an entire outer circumferential surface 13*a* of the engine mount 13 in a state in which it is abutted against the first wall surface 13*a*1. Similarly, the straight part (connection end) 12*c* of the second part member 12 is also welded and fixed in a state in which it is abutted against a second wall surface 13*a*2 of the entire outer circumferential surface 13*a* of the engine mount 13.

As illustrated in FIG. 2, the first wall surface 13*a*1 and the second wall surface 13*a*2 are outer circumferential surfaces of a pair of curved wall portions which are on opposite sides with the central axis of the engine mount 13 sandwiched therebetween. Then, the first part member 11, the first wall surface 13*a*1, the second wall surface 13*a*2, and the second part member 12 are coaxially disposed in that order in the longitudinal direction of the front cross member 10.

The first part member 11 and the second part member 12 are coaxial with each other, and the central axis of the engine mount 13 perpendicularly intersects central axes of them.

As illustrated in FIG. 5, extension pieces 11*a*1, 11*a*2, and 11*a*3 are formed at the left end 11*a* of the first part member 11. Of these, the extension pieces 11*a*1 and 11*a*2 face each other and protrude reward. On the other hand, the extension piece 11*a*3 positioned between the extension pieces 11*a*1 and 11*a*2 protrudes toward the left side. Also, a hole 11*a*4 for connecting a left lower arm (not illustrated) is formed at the left end 11*a* of the first part member 11.

Extension pieces 12*a*1, 12*a*2, and 12*a*3 are also formed at the right end 12*a* of the second part member 12. Of these, extension pieces 12*a*1 and 12*a*2 face each other and protrude rearward. On the other hand, the extension piece 12*a*3 positioned between the extension pieces 12*a*1 and 12*a*2 protrudes toward the right side. Also, a hole 12*a*4 for connecting a right lower arm (not illustrated) is formed at the right end 12*a* of the second part member 12.

In the front cross member 10 constituted by the constituent elements described above, sheet thicknesses of the tapered part 11*b*, the straight part 11*c*, the tapered part 12*b*, and the straight part 12*c* are all the same.

On the other hand, the engine mount 13 has a larger sheet thickness than the tapered part 11*b*, the straight part 11*c*, the tapered part 12*b*, and the straight part 12*c*. That is, when a stiffness distribution is viewed in the longitudinal direction of the front cross member 10, a part at the position of the engine mount 13 in the middle in the longitudinal direction has high stiffness. The engine mount 13 serves as a reinforcing part in which a minimum sheet thickness at connection positions thereof with respect to the straight parts 11c and 12c is 1.6 times or more an average sheet thickness of the straight parts (connection ends) 11c and 12c joined to both sides of the engine mount 13. When the minimum sheet thickness is set to 1.6 times or more the average sheet thickness, an effect of increase in weight due to increase in the sheet thickness can be kept low while dramatically improving the stiffness of the front subframe. Further, the minimum sheet thickness is more preferably 2.0 times or more the average sheet thickness. Also, the minimum sheet thickness is preferably 10.0 times or less the average sheet thickness from the perspective of suppressing increase in weight. Furthermore, the minimum sheet thickness is more preferably 8.0 times or less the average sheet thickness.

Further, the left end 11a and the right end 12a of the front cross member 10 may have a larger sheet thickness than other portions of the front cross member 10. Since the end portions of the front cross member 10 are each a connection point with the lower arm, stress concentration occurs at the connection point due to an input from the lower arm, and local deformation is likely to occur. Therefore, when a sheet thickness in the vicinity of the connecting point is made larger than sheet thicknesses of other portions, decrease in stiffness due to the local deformation can be reduced.

Figure 6:
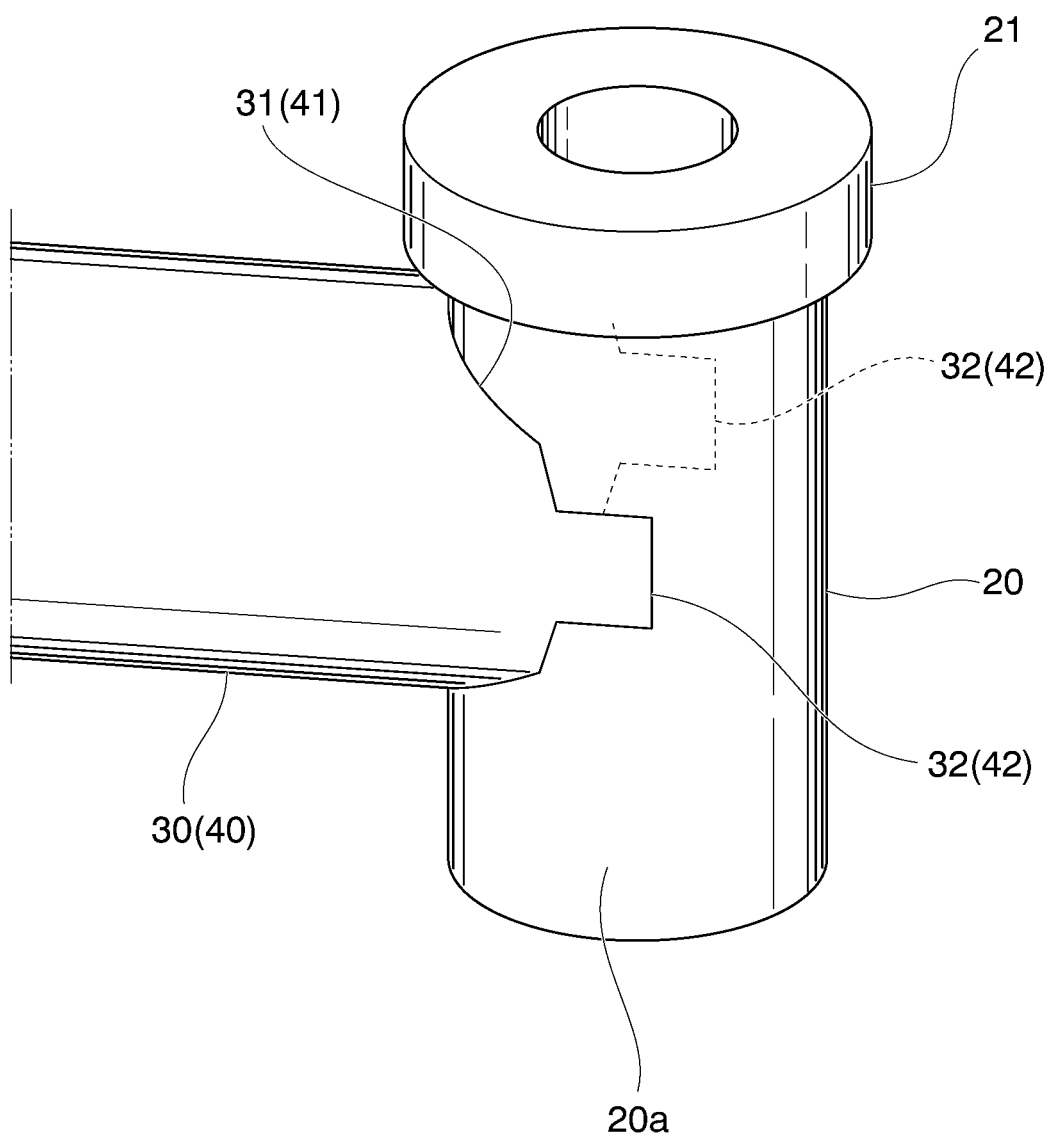
FIG. 6 is a perspective view illustrating joining of the first connection member and the second connection member to a first body mount collar in the front subframe and is an enlarged view of a portion B1 or a portion B2 of FIG. 5. Further, part numbers in parentheses indicate part numbers of B2.

The pair of rear body mounts 20 (body mounts) illustrated in FIGS. 4 to 6 are each a component fixed to a lower portion of the vehicle body (not illustrated). The rear body mounts 20 each have, for example, a cylindrical shape having an axis in the vertical direction. The pair of rear body mounts 20 are disposed to be aligned on the left and right sides with a space therebetween.

An enlarged diameter part 21 having a large outer diameter is formed on an upper portion of each of the rear body mounts 20. Since a longitudinal force or the like from the vehicle body is directly applied to the pair of rear body mounts 20, sheet thicknesses of these, even at a thinnest portion, are configured to be thicker than a sheet thickness of each portion of the front cross member 10. Further, the structure of the rear body mount 20 illustrated in each figure is not limited only to such an example, and structures of general body mounts can be employed.

The connection member 30 (first connection member) is, for example, a skeleton member made of a linear pipe material and directly connects the engine mount 13 and one of the pair of rear body mounts 20. Specifically, one end side of the connection member 30 is welded and fixed in a state in which it is abutted against the outer circumferential surface 13a of the engine mount 13. Also, the other end side of the connection member 30 is welded and fixed at a pair of extension pieces (first extension pieces) 32 in a state in which it is abutted against an outer circumferential surface 20a of one of the rear body mounts 20. An axis of the connection member 30 is substantially perpendicular to the axis of the engine mount 13. Also, the axis of the connection member 30 is also substantially perpendicular to an axis of one of the rear body mounts 20. Further, a female screw may be formed on a side surface of the engine mount 13, a male screw may be formed on one end side of the connection member 30, and the male screw may be screwed into the female screw to fix them. Conversely, a male screw may be formed on the engine mount 13 and a female screw may be formed on the connection member 30 side, and the male screw may be screwed into the female screw to fix them. Also, a protruding part that protrudes from the engine mount 13 to the connection member 30 may be formed to join the connection member 30 to the protruding part.

As illustrated in FIG. 6, on the other end side of the connection member 30, a recessed portion 31 cut out to match an outer circumferential surface of the rear body mount 20, and the pair of extension pieces 32 sandwiching the recessed portion 31 therebetween are formed. The pair of extension pieces 32 protrude outward from the end of the connection member 30. The recessed portion 31 is joined to the outer circumferential surface 20a of the rear body mount 20, and inner surfaces of the pair of extension pieces 32 are also joined to the outer circumferential surface 20a of the rear body mount 20. Further, the above-described one end side of the connection member 30 may also be joined to the outer circumferential surface 13a of the engine mount 13 via a pair of extension pieces (not illustrated).

Also, a cross-sectional shape of the connection member 30 is not particularly limited. For example, the connection member 30 may be formed by a tube member whose cross section has a polygonal shape, a circular shape, an elliptical shape, or the like. Furthermore, in a case of a polygonal shape, a corner portion thereof may either have a ridge line or have an arc-shaped surface. Also, a cross-sectional outer shape at any position in a longitudinal direction of the connection member 30 may be constant in the longitudinal direction or may change from an intermediate position in the longitudinal direction.

The connection member 40 (second connection member) is, for example, a skeleton member made of a linear pipe material and directly connects the engine mount 13 and the other of the pair of rear body mounts 20. Specifically, one end side of the connection member 40 is welded and fixed in a state in which it is abutted against the outer circumferential surface 13a of the engine mount 13. Also, the other end side of the connection member 40 is welded and fixed at a pair of extension pieces (second extension pieces) 42 in a state in which it is abutted against an outer circumferential surface 20a of the other rear body mount 20. An axis of the connection member 40 is substantially perpendicular to the axis of the engine mount 13. Also, the axis of the connection member 40 is also substantially perpendicular to an axis of the other rear body mount 20. Further, a female screw may be formed on a side surface of the engine mount 13, a male screw may be formed on one end side of the connection member 40, and then the male screw may be screwed into the female screw to fix them. Conversely, a male screw may be formed on the engine mount 13 and a female screw may be formed on the connection member 40 side, and the male screw may be screwed into the female screw to fix them. Also, a protruding part that protrudes from the engine mount 13 to the connection member 40 may be formed to join the connection member 40 to the protruding part.

The other end of the connection member 40 includes a recessed portion 41 and the pair of extension pieces 42 similarly to the above-described recessed portion 31 and the pair of extension pieces 32 formed on the other end side of the connection member 30. The recessed portion 41 is joined to the outer circumferential surface 20a of the other rear body mount 20, and inner surfaces of the pair of extension pieces 42 are also joined to the outer circumferential surface 20a of the other rear body mount 20. Further, the above-described one end side of the connection member 40 may also be joined to the outer circumferential surface 13a of the engine mount 13 via a pair of extension pieces (not illustrated).

Also, a cross-sectional shape of the connection member 40 is not particularly limited. For example, the connection member 40 may be formed by a tube member whose cross section has a polygonal shape, a circular shape, an elliptical shape, or the like. Furthermore, in a case of a polygonal shape, a corner portion thereof may either have a ridge line or have an arc-shaped surface. Also, a cross-sectional outer shape at any position in a longitudinal direction of the connection member 40 may be constant in the longitudinal direction or may change from an intermediate position in the longitudinal direction.

Further, the connection member 30 and the connection member 40 illustrated in FIG. 1 or the like are formed by straight pipes, but shapes of the connection member 30 and the connection member 40 are not limited only to such an example. For example, the connection member 30 and the connection member 40 may be formed by a pipe material having an enlarged diameter or reduced diameter at an end portion or a pipe material that is partially bent. Also, the connection member 30 may be formed so that a virtual straight line connecting centroids of outer shapes at both end positions of the connection member 30 in a cross section perpendicular to the extending direction is inside the connection member 30. The same applies to the connection member 40.

Figure 7:
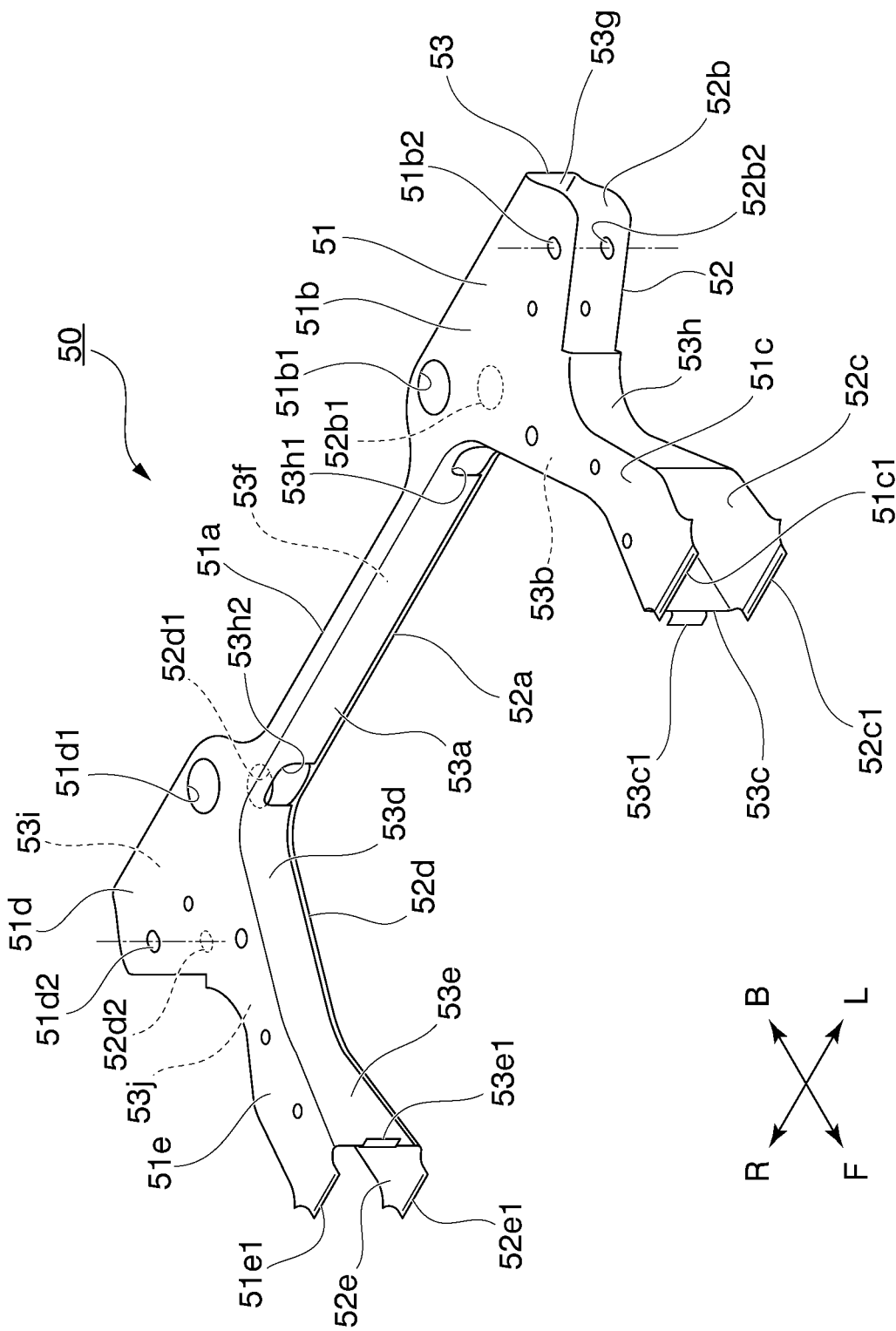
FIG. 7 is a perspective view illustrating a rear member of the front subframe.

The rear member 50 illustrated in FIG. 7 is a skeleton member having substantially a U-shape in a plan view and includes a pair of upper plate 51 and lower plate 52, and a side plate 53 connecting the upper plate 51 and the lower plate 52.

The upper plate 51 includes a central part 51a extending linearly in the left-right direction in a plan view, a left corner part 51b which is continuous with a left side of the central part 51a and in which a through hole 51b1 for holding the rear body mount 20 is formed, a left arm part 51c which is continuous to the front from the left corner part 51b, a right corner part 51d which is continuous with a right side of the central part 51a and in which a through hole 51d1 for holding the rear body mount 20 is formed, and a right arm part 51e which is continuous to the front from the right corner part 51d.

A direction in which the central part 51a extends and a direction in which the left corner part 51b and the left arm part 51c are aligned are substantially perpendicular to each other. A direction in which the central part 51a extends and a direction in which the right corner part 51d and the right arm part 51e are aligned are also substantially perpendicular to each other.

The lower plate 52 has the same shape as the upper plate 51 in a plan view. That is, the lower plate 52 includes a central part 52a extending linearly in the left-right direction in a plan view, a left corner part 52b which is continuous with a left side of the central part 52a and in which a through hole 52b1 for holding the rear body mount 20 is formed, a left arm part 52c which is continuous to the front from the left corner part 52b, a right corner part 52d which is continuous with a right side of the central part 52a and in which a through hole 52d1 for holding the rear body mount 20 is formed, and a right arm part 52e which is continuous to the front from the right corner part 52d.

A direction in which the central part 52a extends and a direction in which the left corner part 52b and the left arm part 52c are aligned are substantially perpendicular to each other. A direction in which the central part 52a extends and a direction in which the right corner part 52d and the right arm part 52e are aligned are also substantially perpendicular to each other.

The side plate 53 includes a central part 53a that connects both front side edges of the central part 51a and the central part 52a in the vertical direction, a left corner part 53b that connects both inner side edges of the left corner part 51b and the left corner part 52b in the vertical direction, a left arm part 53c that connects both inner side edges of the left arm part 51c and the left arm part 52c in the vertical direction, a right corner part 53d that connects both inner side edges of the right corner part 51d and the right corner part 52d in the vertical direction, and a right arm part 53e that connects both inner side edges of the right arm part 51e and the right arm part 52e in the vertical direction.

The left corner part 53b and the left arm part 53c are continuous to be integrated with each other. The right corner part 53d and the right arm part 53e are also continuous to be integrated with each other. Also, a through hole 53h1 for inserting the connection member 30 is formed between the central part 53a and the left corner part 53b. Similarly, a through hole 53h2 for inserting the connection member 40 is formed between the central part 53a and the right corner part 53d.

Further, the side plate 53 includes a central part 53f that connects both rear side edges of the central part 51a and the central part 52a in the vertical direction, a left corner part 53g that connects both outer side edges of the left corner part 51b and the left corner part 52b in the vertical direction, a left arm part 53h that connects both outer side edges of the left arm part 51c and the left arm part 52c in the vertical direction, a right corner part 53i that connects both outer side edges of the right corner part 51d and the right corner part 52d in the vertical direction, and a right arm part 53j that connects both outer side edges of the right arm part 51e and the right arm part 52e in the vertical direction. The central part 53a, the left corner part 53g, and the right corner part 53i are continuous to be integrated with each other.

Holes 51b2 and 52b2 for connecting the left lower arm (not illustrated) are formed in the left corner part 51b and the left corner part 52b of the rear member 50. Similarly, holes 51d2 and 52d2 for connecting the right lower arm (not illustrated) are formed in the right corner part 51d and the right corner part 52d of the rear member 50.

In the left arm part 51c of the rear member 50, an extension piece 51c1 is formed to protrude toward the front. Similarly, also in the left arm part 52c, an extension piece 52c1 is formed to protrude toward the front. Further, also in the left arm part 53b, an extension piece 53c1 is formed to protrude to the right.

In the right arm part 51e of the rear member 50, an extension piece 51e1 is formed to protrude toward the front. Similarly, also in the right arm part 52e, an extension piece 52e1 is formed to protrude toward the front. Further, also in the right arm part 53e, an extension piece 53e1 is formed to protrude to the left.

Figure 8:
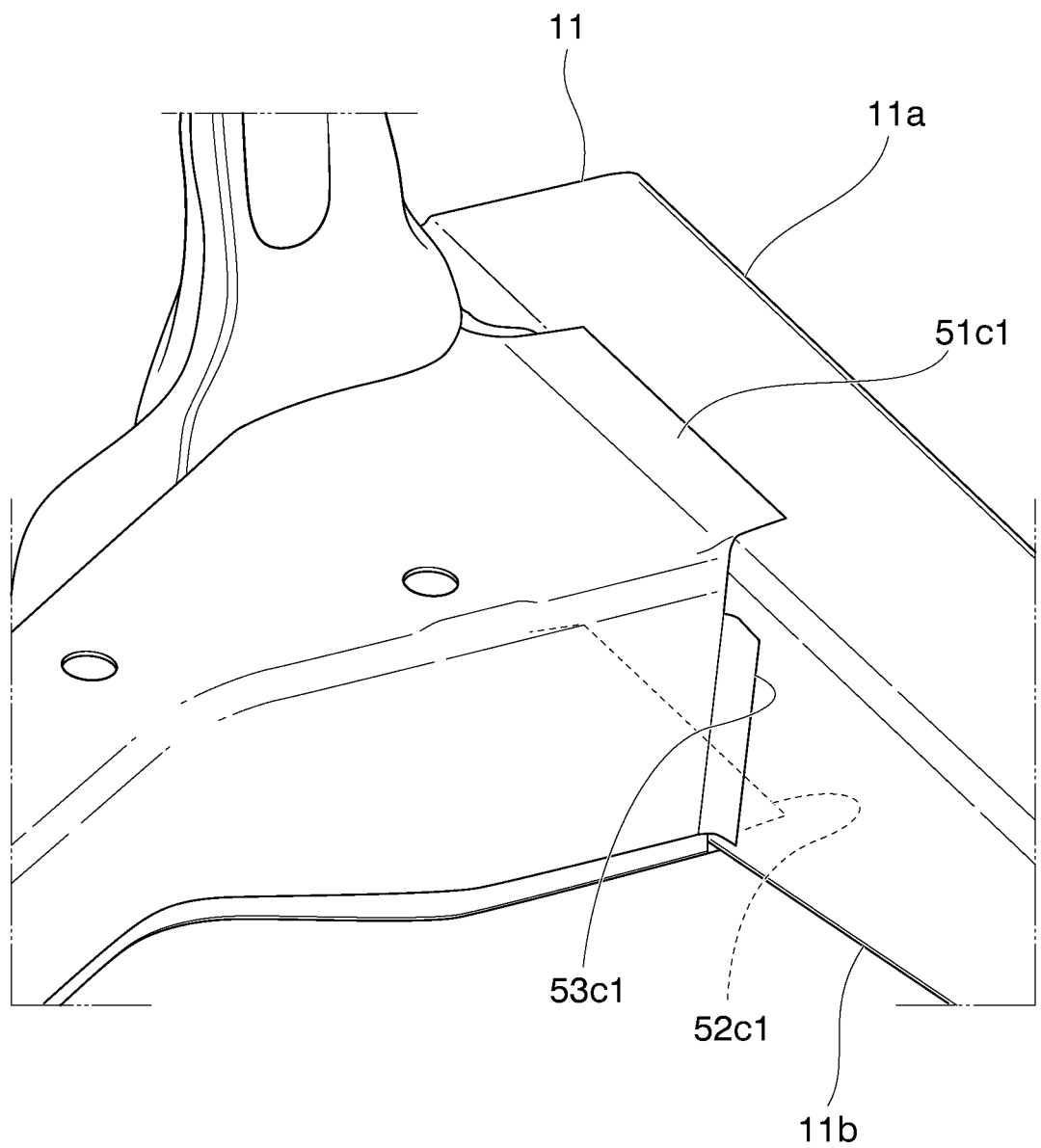
FIG. 8 is a view illustrating a joined state between members of the front subframe and is an enlarged perspective view of a portion C in FIG. 3.
Figure 9:
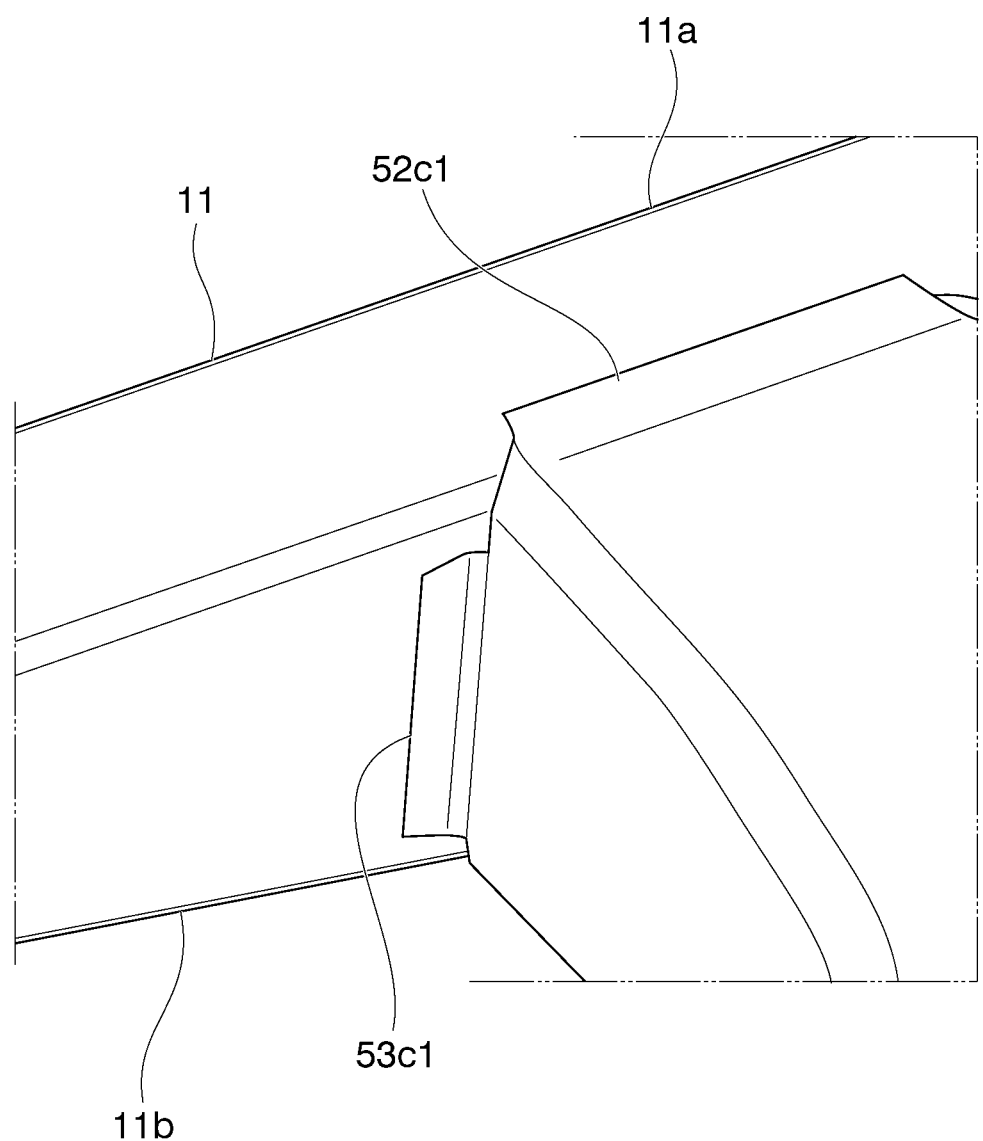
FIG. 9 is a view illustrating a joined state between members of the front subframe and is an enlarged perspective view from a back surface side of FIG. 8.

As illustrated in FIGS. 8 and 9, the extension piece 51c1, the extension piece 52c1, and the extension piece 53c1 are joined to a connection portion between the left end 11a and the tapered part 11b of the front cross member 10. Specifically, the above-described connection portion is sandwiched between a pair of extension piece 51c1 and extension piece 52c1, and the extension piece 53c1 is joined to a side surface of the tapered part 11b.

Similarly, the extension piece 51e1, the extension piece 52e1, and the extension piece 53e1 are joined to a connection portion between the right end 12a and the tapered part 12b of the front cross member 10. Specifically, the above-described connection portion is sandwiched between a pair of extension piece 51e1 and extension piece 52e1, and the extension piece 53e1 is joined to a side surface of the tapered part 12b.

The front body mounts 60 illustrated in FIG. 1 are components fixed to the lower portion of the vehicle body and include a left body mount 61 disposed on the left side and a right body mount 62 disposed on the right side.

The left body mount 61 includes a standing part 61a provided to stand obliquely upward to the left from a position on a rear side of the left end 11a of the front cross member 10 and on a leftward side of the rear member 50, and a collar 61b fixed to an upper portion of the standing part 61a.

The collar 61b is a component fixed to the lower portion of the vehicle body and has a cylindrical shape having an axis in the vertical direction. An enlarged diameter part having a large outer diameter is formed on an upper portion of the collar 61b.

The standing part 61a is joined so that a lower end portion thereof is sandwiched between a pair of extension pieces 11a1 and 11a2 described above. In addition, the extension piece 11a3 is also joined to a side surface of the above-described lower end portion.

Also, a pair of extension pieces 61a1 protruding leftward are formed on the upper portion of the standing part 61a. Then, the collar 61b is joined to be sandwiched between the pair of extension pieces 61a1.

Also, a hole 61a2 for connecting the left lower arm is formed on a surface of the standing part 61a on a side facing the front cross member 10.

The right body mount 62 includes a standing part 62a provided to stand obliquely upward to the right from a position on a rear side of the right end 12a of the front cross member 10 and on a rightward side of the rear member 50, and a collar 62b fixed to an upper portion of the standing part 62a.

The collar 62b is a component fixed to the lower portion of the vehicle body together with the above-described collar 61b and has a cylindrical shape having an axis in the vertical direction. An enlarged diameter part having a large outer diameter is formed on an upper portion of the collar 62b.

The standing part 62a is joined so that a lower end portion thereof is sandwiched between a pair of extension pieces 12a1 and 12a2 described above. In addition, the extension piece 12a3 is also joined to a side surface of the above-described lower end portion.

Also, a pair of extension pieces 62a1 protruding rightward are formed on the upper portion of the standing part 62a. Then, the collar 62b is joined to be sandwiched between the pair of extension pieces 62a1.

Also, a hole 62a2 for connecting the left lower arm is formed on a surface of the standing part 62a on a side facing the front cross member 10.

Further, the structure of the front body mounts 60 illustrated in each figure is not limited only to such an example, and structures of general body mounts can be employed.

The front subframe having the above-described configuration is fixed to the lower portion of the vehicle body at four places including the collars 61b and 62b and the pair of rear body mounts 20. Also, the left lower arm (not illustrated) is connected to the left end 11a, and the right lower arm (not illustrated) is connected to the right end 12a.

During cornering of the vehicle body, a lateral force with respect to the front cross member 10 in an axial direction thereof is applied from the left or right lower arm (not illustrated). Also, when the vehicle body accelerates or decelerates, a longitudinal force is applied to the front cross member 10 from the left and right lower arms. The front subframe according to the present embodiment is lightweight, has high stiffness, and has a high load transmission efficiency. A specific structure for that will be described below.

The left lower arm (not illustrated) is connected to the hole 11a4 of the left end 11a in the front cross member 10, the hole 61a2 of the standing part 61a, and the hole 51b2 of the left corner part 51b and the hole 52b2 of the left corner part 52b in the rear member 50 illustrated in FIG. 1. Also, the right lower arm (not illustrated) is connected to the hole 12a4 of the right end 12a in the front cross member 10, the hole 62a2 of the standing part 62a, and the hole 51d2 of the right corner part 51d and the hole 52d2 of the right corner part 52d in the rear member 50.

Further, although a shape of the front cross member 10 is not particularly limited, for example, in the plan view illustrated in FIG. 3, the front cross member 10 may be formed so that a virtual straight line EL connecting a centroid of an outer shape in a cross section perpendicular to the extending direction of the first part member 11 at a left end edge LE and a centroid of an outer shape in a cross section perpendicular to the extending direction of the second part member 12 at a right end edge RE is present inside the first part member 11, the second part member 12, and the engine mount 13. Specifically, the virtual straight line EL is preferably present within a range of an outer shape defined by front surfaces ff, rear surfaces rf, top surfaces tf, and lower surfaces bf of the first part member 11 and the second part member 12 and within a range of an outer shape defined by a front surface 13f, a rear surface 13r, a top surface 13t, and a lower surface 13b of the engine mount 13 illustrated in FIG. 10. According to the above-described configuration, regardless of whether a lateral force L1 is applied from the left lower arm or the right lower arm, the front cross member 10 can receive the lateral force L1 as an axial force in a longitudinal direction thereof. Therefore, higher stiffness can be exhibited compared to a structure in which the lateral force L1 is received by bending or twisting of the front cross member 10. Such a front cross member 10 may have, for example, substantially a straight shape or the like as illustrated in FIG. 1.

Figure 10:
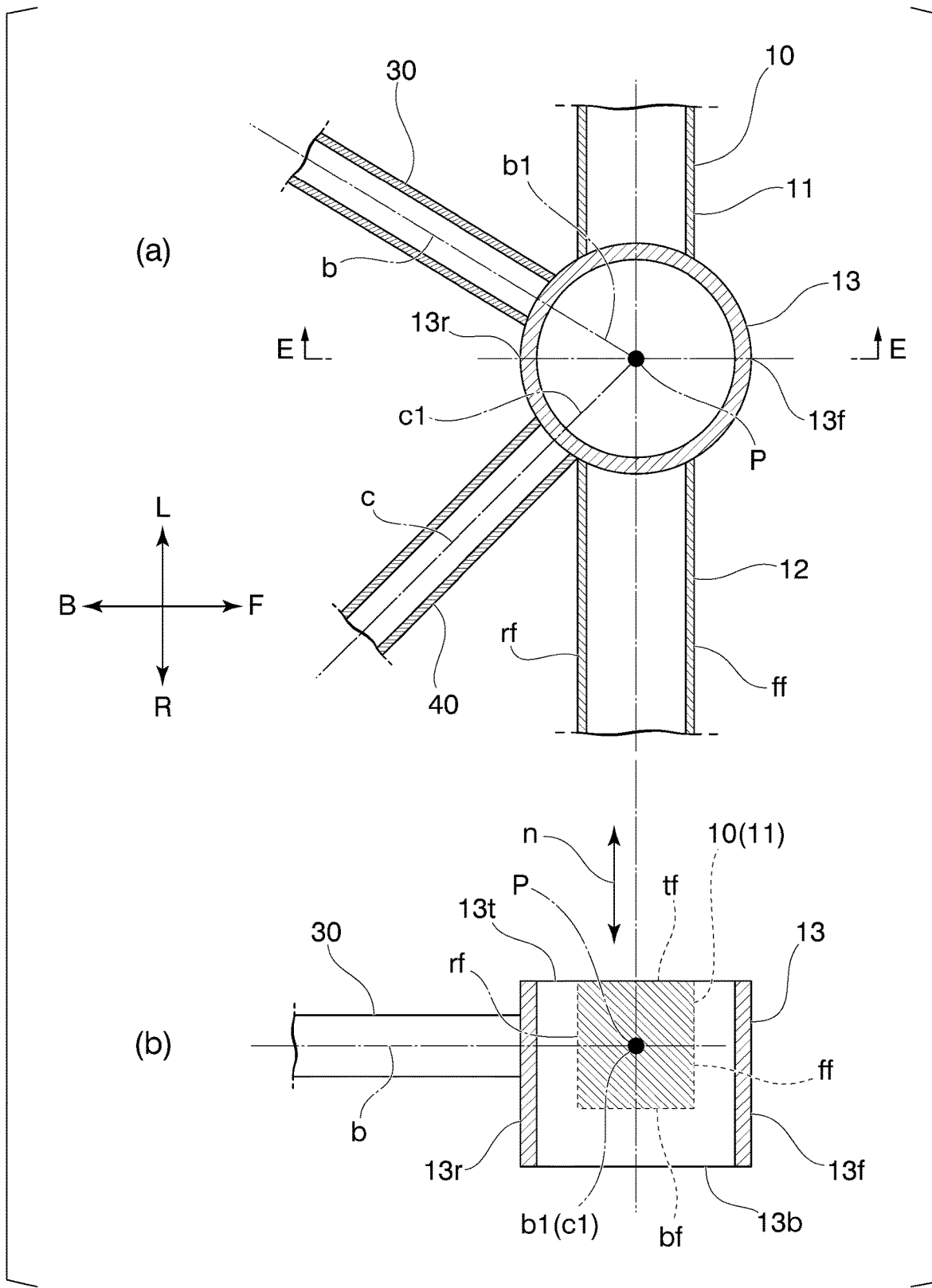

Further, the connection members 30 and 40 are connected to the front cross member 10 having the above-described shape with a relative positional relationship as illustrated in FIG. 10.

That is, as illustrated in FIG. 10(a), an extended line b1 of a first axis b passing through a centroid of an outer shape at any position in a longitudinal direction of the connection member 30 in a cross section perpendicular to the longitudinal direction and an extended line c1 of a second axis c passing through a centroid of an outer shape at any position in a longitudinal direction of the connection member 40 in a cross section perpendicular to the longitudinal direction intersect (match) at a position of an intersection point P in the engine mount 13 of the front cross member 10 in a plan view. This intersection point P is positioned between the front surface 13f and the rear surface 13r of the engine mount 13 when viewed in a front-rear direction.

Further, as illustrated in FIG. 10(b), when the intersection point P is viewed in a longitudinal section perpendicular to the longitudinal direction of the front cross member 10 including the position of the intersection point P, the extended line b1 and the extended line c1 are positioned inside the engine mount 13 of the front cross member 10. More specifically, the extended line b1 and the extended line c1 are each present as a "point" in the longitudinal section of FIG. 10(b), but positions of these "points" are within the range of the outer shape defined by the front surface 13f, the rear surface 13r, the top surface 13t, and the lower surface 13b of the engine mount 13. Further, the top surface 13t and the lower surface 13b of the engine mount 13 open upward and downward, but in this case, when a square frame is formed by connecting upper edges and lower edges of the front surface 13f and the lower surface 13r to each other, it is regarded as the above-described outer shape of the engine mount 13.

Even when another component (for example, a rack gear mount, a body mount, a differential gear mount, a motor mount, a battery mount, or the like) is employed as the reinforcing part instead of the engine mount 13, in a longitudinal sectional view at the position of the intersection point P, both the extended line b1 and the extended line c1 are configured to be positioned in a closed cross section in which all outer shape lines forming an outer shape thereof are connected or in an open cross section in which some of the outer shape lines are not present. In this case also, the extended line b1 and the extended line c1 may match or be separated from each other in the above-described longitudinal section.

In the case of the present embodiment, as illustrated in FIG. 10(b), even in the range of the above-described outer shape in the longitudinal section, both the extended line b1 and the extended line c1 are preferably positioned particularly within a range illustrated by hatching. In this case also, the extended line b1 and the extended line c1 may match or be separated from each other in the longitudinal section. The range illustrated by hatching is a range of outer shape lines of the straight part 11c of the first part member 11 and the straight part 12c of the second part member 12 at both side positions (joining positions) of the engine mount 13 defined by the front surface ff, the rear surface rf, the top surface tf and the lower surface bf. As illustrated in FIG. 10(b), outer shapes of the first part member 11 and the second part member 12 are closer to a centroid of the front cross member 10 than an outer shape of the engine mount 13 is. Therefore, when both the extended line b1 and the extended line c1 are positioned within the range illustrated by the hatching, a load transmission efficiency can be further improved.

Figure 11:
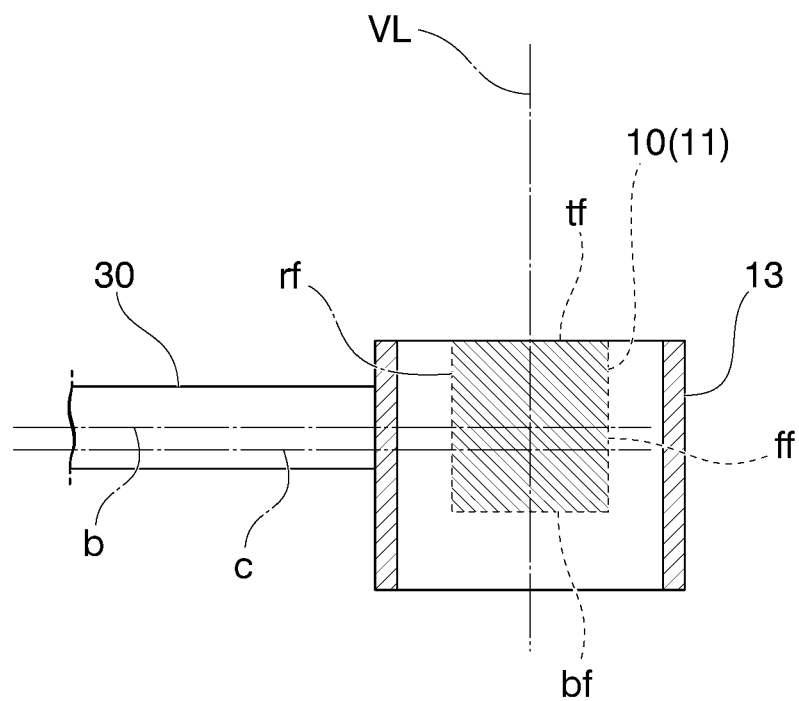
FIG. 11 is a view illustrating the main part of the front subframe and is a longitudinal sectional view illustrating a case in which an extended line b1 of a first axis b and an extended line c1 of a second axis c are deviated from each other in the same cross section as FIG. 10(b).

Further, the extended line b1 of the first axis b and the extended line c1 of the second axis c need only intersect in a plan view. That is, in the longitudinal sectional view, the extended line b1 of the first axis b and the extended line c1 of the second axis c do not necessarily have to intersect. For example, as illustrated in FIG. 11, the connection member 30 and the connection member 40 need only be provided so that the extended line b1 of the first axis b and the extended line c1 of the second axis c pass through the inside of the front cross member 10. Further, in FIG. 11, the extended line b1 of the first axis b and the extended line c1 of the second axis c intersect at a position on a vertical line VL in a plan view.

As illustrated in FIG. 10(b), in the present embodiment, at the position of the intersection point P at which the extended line b1 of the first axis b and the extended line c1 of the second axis c intersect when viewed from a normal direction n (a direction corresponding to a vehicle vertical direction in the present embodiment) of the extended line of the first axis b in a cross section perpendicular to the longitudinal direction of the front cross member 10, the extended line b1 of the first axis b and the extended line c1 of the second axis c are positioned inside the front cross member 10, and the extended line b1 of the first axis b and the extended line c1 of the second axis c are inside the front cross member 10 in a cross-sectional view perpendicular to the longitudinal direction of the front cross member 10.

Also, as illustrated in FIG. 3, when the entire length from the left end edge LE to the right end edge RE of the front cross member 10 is L (mm), joining positions of the connection members 30 and 40 to the front cross member 10 are preferably adjusted so that a distance Lx (mm) from the left end LE to the intersection point P is within a range of 0.20×L (mm) or more and 0.80×L (mm) or less. Further, the distance Lx (mm) is more preferably 0.35×L (mm) or more and 0.65×L (mm) or less.

According to the above-described configuration, since the front cross member 10 that has received the lateral force L1 is supported by the pair of rear body mounts 20 via the connection members 30 and 40, relative displacement thereof with respect to the rear member 50 can be prevented. That is, since deformation of the rectangular frame constituting the front subframe can be prevented, it is possible to increase stiffness of not only the front cross member 10 alone but also the front subframe as a whole. Moreover, since the stiffness can be increased without increasing a sheet thickness and a cross-sectional dimension, a front subframe having high stiffness while being lightweight can be obtained.

The present invention is not limited only to the configuration described in the above-described embodiment and various modifications can be made within the scope not departing from the gist of the present invention.

For example, a shape of the engine mount 13 is a cylindrical shape in the above-described embodiment, but the present invention is not limited only to the shape. As the engine mount 13, since a recess for receiving an arm (not illustrated above) that supports rocking of the engine need only be formed in addition to the partial reinforcement of the front cross member 10, a polygonal cylindrical shape such as a quadrangular cylindrical shape may also be employed instead. Furthermore, in a case of a polygonal shape, a corner portion thereof may either have a ridge line or have an arc-shaped surface.

In cases of any shape, it is preferable to employ the engine mount 13 having an external dimension in the front-rear direction larger than those of the first part member 11 and the second part member 12. When the connection members 30 and 40 are joined to such an engine mount 13, joining positions of the connection members 30 and 40 can be separated from the intersection point P. Thereby, the joining position of the connection member 30 and the joining position of the connection member 40 can be separated from each other. As a result, since the connection members 30 and 40 can be joined with a spatial room, reliability of a joining strength can be further improved.

Also, in the above-described embodiment, the structure has been configured such that stiffness at the joint portion of the front cross member 10 with respect to the connection members 30 and 40 is partially increased by causing the engine mount 13 having a larger sheet thickness than the first part member 11 and the second part member 12 to be interposed therebetween, but the present invention is not limited to the structure. For example, the front cross member 10 may be formed as a single component by omitting the engine mount 13 from between the first part member 11 and the second part member 12. Then, reinforcing plates (not illustrated) may be joined to positions of the joint portions of the front cross member 10 with respect to the connection members 30 and 40 in the longitudinal direction to partially increase a sheet thickness thereof by welding or the like in advance. In this case, when viewed in a cross section perpendicular to the longitudinal direction of the front cross member 10, of the four side surfaces, the reinforcing plate may be provided only on one side surface to which the connection members 30 and 40 are joined, but the reinforcing plate is preferably provided on all the four side surfaces to increase the sheet thickness. Also, a total thickness of the portion reinforced by the reinforcing plate is preferably 1.6 times or more and 10.0 times or less an average sheet thickness on both sides thereof to which the reinforcing plate is not provided, even at the thinnest portion.

Further, as a material of each constituent element constituting the front subframe, it is most preferable to use steel (particularly a cold-rolled steel sheet made of high-tensile steel), but other materials may also be used. For example, acrylic fibers, carbon fibers, carbon fiber-reinforced resin (CFRP) using reinforced plastic, glass fiber-reinforced resin (GFRP), or the like may be used. In this case, joining between the constituent elements may be performed by joining methods of various types such as an adhesive or bolt fastening. Light metals such as aluminum or magnesium may also be employed.

Joining methods of various types such as an adhesive, arc welding, spot welding, laser welding, bolt fastening, or screwing can be applied to the joining between the constituent elements.

Forming of each constituent element may be any of press forming, casting, and forging.

Also, in the above-described embodiment, a configuration in which a length of the first part member 11 is smaller than that of the second part member 12, and a position of the engine mount 13 is deviated to the left side away from a central position in the left-right direction has been employed. The reason for this is that the engine (not illustrated) disposed to be displaced to the left side is supported by the engine mount 13 that is also disposed to be displaced to the left side. However, the position of the engine mount 13 is not limited only to the configuration in which the engine mount 13 is displaced to the left side. Conversely, a configuration in which a length of the second part member 12 is smaller than that of the first part member 11, and a position of the engine mount 13 is deviated to the right side away from the central position in the left-right direction may also be employed. Alternatively, a configuration in which lengths of the first part member 11 and the second part member 12 are equal, and a position of the engine mount 13 is at the central position in the left-right direction may also be employed.

Also, in the above-described embodiment, an example in which the first part member 11 and the second part member 12 are formed by a square hollow member has been described, but a shape of the front cross member 10 formed by these is not particularly limited. For example, the front cross member 10 may be formed by a tube member whose cross section has a polygonal shape, a circular shape, an elliptical shape, or the like. Furthermore, in a case of a polygonal shape, a corner portion thereof may either have a ridge line or have an arc-shaped surface.

Also, a cross-sectional outer shape of the front cross member 10 at any position in the longitudinal direction may be constant in the longitudinal direction or may change from an intermediate position in the longitudinal direction.

Also, in the above-described embodiment, a case in which the present invention is applied to the front subframe disposed at a front position of the vehicle body has been described, but the present invention may also be applied to a rear subframe disposed at a rear position of the vehicle body. Furthermore, the present invention may be applied to both the front subframe and the rear subframe. When the present invention is applied to both the front subframe and the rear subframe, a configuration in which the engine mount 13 is provided on a side at which the engine is disposed, and the reinforcing plate, instead of the engine mount 13, is provided on a side at which the engine is not disposed may be used. When the present invention is applied to a rear subframe of a rear-wheel drive vehicle or a four-wheel drive vehicle, a collar of a differential gear mount may be used as the reinforcing part. Also, for example, when the vehicle body is for an electric vehicle, since there is a less need to provide an engine mount, the engine mount 13 may not be provided. In a case of an electric vehicle, a mount part of the motor or battery may be used as the reinforcing part.

Also, in the above-described embodiment, a case in which the connection members 30 and 40 are connected between the front cross member 10 and each of the pair of rear body mounts 20 has been described, but the number of the rear body mounts 20 may also be three or more. In this case, the number of connection members extending from the rear body mounts 20 to the front cross member 10 may be two or more. Also, of the plurality of connection members extending from the rear body mounts 20, at least two connection members may be joined to the front cross member 10 as described above.

Also, in the above-described embodiment, an example in which the pair of rear body mounts 20 and the connection members 30 and 40 are connected has been described, but the technology according to the present disclosure is not limited to such an example. For example, a front-rear positional relationship between the cross member of the subframe and the body mounts may be reversed. That is, when the cross member of the subframe is provided on a vehicle rear side with respect to a frame member including the body mounts, the body mounts and the cross member may be joined by the connection members as described above.

Also, in the above-described embodiment, an example in which the technology of the present disclosure is applied to a structure of the subframe has been described as an example of the lower vehicle body structure, but the technology according to the present disclosure is not limited to such an example. For example, the technology according to the present disclosure is not limited to the structure of the subframe and can be applied to suspension structures of various types.

The gist of the lower vehicle body structure according to the above-described embodiment will be summarized below.

(1) A lower vehicle body structure according to the present embodiment includes: the lower arms (suspension components); the front cross member (cross member) 10 having the first part member 11 and the second part member 12 which are a pair of part cross members connected to the lower arm, and the engine mount (reinforcing part) 13 coaxially connected between the first part member 11 and the second part member 12; the plurality of rear body mounts (body mounts) 20; and the connection members 30 and 40 directly connecting between each of the rear body mounts 20 and the engine mount 13. Then, a minimum sheet thickness of the engine mount 13 at connection positions with respect to the first part member 11 and the second part member 12 is 1.6 times or more an average sheet thickness at connection ends of the first part member 11 and the second part member 12 with respect to the engine mount 13.

According to the lower vehicle body structure of the above-described (1), a lateral force in a longitudinal direction of the front cross member 10 and a longitudinal force perpendicular to the longitudinal direction are applied to the front cross member 10 from the lower arms. Of these, the front cross member 10 receives the lateral force as a compressive axial force or a tensile axial force in a direction in which the front cross member 10 extends. Therefore, higher stiffness can be secured than that when the lateral force is received by bending of the front cross member 10.

In addition, the front cross member 10 is supported by the plurality of rear body mounts 20 via the connection members 30 and 40. Therefore, the longitudinal force applied to the front cross member 10 can be transmitted to the plurality of rear body mounts 20 with a high load transmission efficiency.

Here, since a minimum sheet thickness of the engine mount 13 is set to 1.6 times or more an average sheet thickness at the connection ends of the first part member 11 and the second part member 12 with respect to the engine mount 13, a bending stiffness of a wall portion of the engine mount 13 at connection positions of the first part member 11 and the second part member 12 with respect to the engine mount 13 can be increased to four times or more a bending stiffness of each of the connection ends. Since the lateral force and the longitudinal force applied to the front cross member 10 are transmitted via the engine mount 13 having such high bending stiffness, a load transmission efficiency can be improved. Moreover, the stiffness of the front cross member 10 particularly at the joining portion to the connection members 30 and 40 can be increased. Therefore, a weight can be reduced compared to a case in which a sheet thickness and a cross-sectional dimension are increased over the entire length of the front cross member 10 to increase stiffness.

(2) In the above-described (1), the following configuration may also be employed.

That is, the straight part (the connection end) 11c of the first part member (one of the part cross members) 11 is abutted and connected to the first wall surface 13a1 of the engine mount 13, and the straight part (the connection end) 12c of the second part member (the other of the part cross members) 12 is abutted and connected to the second wall surface 13a2 of the engine mount 13. Then, the first part member 11, the first wall surface 13a1, the second wall surface 13a2, and the second part member 12 are coaxially disposed in that order in the longitudinal direction of the front cross member 10.

(3) In the case of the above-described (1) or (2), the following configuration may also be employed.

That is, the plurality of connection members include the connection member (first connection member) 30 and the connection member (second connection member) 40. Further, in a longitudinal section perpendicular to the longitudinal direction of the cross member 10, which includes a position of the intersection point P where the extended line b1 of the first axis b passing through a centroid of an outer shape at any position in the longitudinal direction of the connection member 30 in a cross section perpendicular to the longitudinal direction and the extended line c1 of the second axis c passing through a centroid of an outer shape at any position in the longitudinal direction of the connection member 40 in a cross section perpendicular to the longitudinal direction intersect in a plan view, the extended line b1 of the first axis b and the extended line c1 of the second axis c are inside the engine mount 13.

According to the lower vehicle body structure of the above-described (3), the front cross member 10 is supported by the plurality of rear body mounts (body mounts) 20 via the appropriately disposed connection members 30 and 40. Therefore, a longitudinal force applied to the front cross member 10 can be transmitted to the plurality of rear body mounts 20 with a higher load transmission efficiency.

Further, the above-described "inside the engine mount 13" refers to the inside of a range defined by outer shape lines when the engine mount 13 is viewed in a longitudinal section including a central axis thereof. However, the above-described outer shape lines include not only a case in which all of them are connected to form a closed cross section but also a case in which some of them are not connected to form an open cross section. In a case of the open cross section, when end portions of outer shape lines positioned on both sides of a missing outer shape line are connected to each other with a virtual straight line to form a closed outer shape, this closed outer shape can be referred to as the "inside the engine mount 13."

(4) In the case of the above-described (3), the extended line b1 of the first axis b and the extended line c1 of the second axis c may coincide with each other at one point (intersection point P) in the engine mount 13 when viewed in the longitudinal section.

In the case of the above-described (4), a longitudinal force applied to the front cross member 10 can be transmitted to the rear body mounts 20 with a higher load transmission efficiency.

(5) In the lower vehicle body structure according to the above-described (4), both the extended line b1 of the first axis b and the extended line c1 of the second axis c may be inside a projected outer shape of the straight part 11c of the first part member 11 and the straight part 12c of the second part member 12 when viewed in the longitudinal section. More specifically, when outer shape lines of the connection end of the straight part 11c with respect to the engine mount 13 and outer shape lines of the connection end of the straight part 12c with respect to the engine mount 13 are projected onto the longitudinal section, both the extended line b1 and the extended line c1 may be positioned inside these two projected outer shapes.

In the case of the above-described (5), a longitudinal force applied to the front cross member 10 can be transmitted to the plurality of rear body mounts 20 with a higher load transmission efficiency.

(6) In the lower vehicle body structure according to any one of the above-described (3) to (5), the connection member 30 may be joined to one of the pair of rear body mounts 20 via the pair of extension pieces (first extension pieces) 32 facing each other.

In the case of the above-described (6), since surface-joining is performed via the extension pieces 32, a higher joining strength can be obtained than that when abutting joining is simply performed.

(7) In the lower vehicle body structure according to any one of the above-described (3) to (6), the connection members 40 may also be joined to the other of the pair of rear body mounts 20 via a pair of extension pieces (second extension pieces) 42 facing each other.

In the case of the above-described (7), since surface-joining is performed via the extension pieces 32, a higher joining strength can be obtained than that when abutting-joining is simply performed.

(8) In the lower vehicle body structure according to any one of the above-described (1) to (7), the engine mount 13 has been exemplified as a bush collar forming a reinforcing part.

In the case of the above-described (8), reinforcement can be made without using an additional component.

Further, not being limited only to the engine mount 13, a rack gear mount, another body mount, a differential gear mount, a motor mount, or a battery mount may be employed as the reinforcing part.

That is, a rack gear mount illustrated in FIG. 18A may be coaxially connected between the first part member 11 and the second part member 12, and in this case, a sheet thickness within a range indicated by reference symbol R is used for a minimum sheet thickness of the rack gear mount.

Also, when a body mount illustrated in FIG. 18B is coaxially connected between the first part member 11 and the second part member 12, a sheet thickness within a range indicated by reference symbol R is used for a minimum sheet thickness of the body mount.

Also, when a differential gear mount illustrated in FIG. 18C is coaxially connected between the first part member 11 and the second part member 12, a sheet thickness within a range indicated by reference symbol R is used for a minimum sheet thickness of the differential gear mount.

Also, when a motor mount illustrated in FIG. 18D is coaxially connected between the first part member 11 and the second part member 12, a sheet thickness within a range indicated by reference symbol R is used for a minimum sheet thickness of the motor mount.

Also, when a battery mount illustrated in FIG. 18E is coaxially connected between the first part member 11 and the second part member 12, a sheet thickness within a range indicated by reference symbol R is used for a minimum sheet thickness of the battery mount.

(9) In the lower vehicle body structure according to the above-described (1) to (8), the following configuration may also be employed.

The reinforcing part is the engine mount 13, or any one of the rack gear mount, the body mount, the differential gear mount, the motor mount, and the battery mount having a cylindrical shape; and the first part member 11, the second part member 12, and the connection members 30 and 40 are abutted and connected to an outer circumferential surface of the reinforcing part.

In the case of the above-described (9), the reinforcing part has a cylindrical shape having a high mechanical strength, and since an outer circumferential surface thereof receives an external force from the first part member 11, the second part member 12, and the connection members 30 and 40, a higher load transmission efficiency can be obtained.

(10) In the lower vehicle body structure according to any one of the above-described (1) to (9), as illustrated in FIG. 3, a virtual straight line EL connecting centroids of outer shapes in a cross section perpendicular to the longitudinal direction at positions of both ends of the front cross member 10 may pass through the inside of the front cross member 10 at any position in the longitudinal direction of the front cross member 10.

According to this configuration, since a degree of linearity of the front cross member 10 is increased, the stiffness against a lateral force is higher than that in a case of a shape with a large curvature. Further, the outer shape at each position of both ends of the front cross member 10 is not limited only to a case of an outer shape closed by connecting all the outer shape lines but also includes a case of an outer shape that is open without some of the outer shape lines (for example, U-shape or the like) as illustrated in FIG. 5. In a case of the open outer shape, it is preferable to connect end portions of outer shape lines positioned on both sides of a missing outer shape line to each other with a virtual straight line to form a closed outer shape, and then obtain a centroid on the basis of this closed outer shape. When it is described with reference to FIG. 4, a substantially quadrangular closed space is formed by providing the virtual straight line EL after removing the extension pieces 11a1 and 11a2 from the left end of the first part member 11. Then, a centroid of this closed space is obtained.

EXAMPLES

Example 1

In order to confirm effects of the present invention, weight and stiffness of the subframe according to the above-described embodiment (invention example 1) and those of a subframe according to comparative example 1 were compared by a numerical calculation.

Invention example 1 has the structure illustrated in FIG. 1. That is, in invention example 1, in a longitudinal section perpendicular to the longitudinal direction of the cross member 10, which includes a position of the intersection point P at which the extended line b1 of the first axis b passing through a centroid at any position in the longitudinal direction of the connection member 30 and the extended line c1 of the second axis c passing through a centroid at any position in the longitudinal direction of the connection member 40 intersect in a plan view, the extended line b1 of the first axis b and the extended line c1 of the second axis c are inside the front cross member 10. Also, when viewed also in the longitudinal section, the extended line b1 of the first axis b and the extended line c1 of the second axis c coincide with each other at the intersection point P which is one point in the front cross member 10. The engine mount 13 is connected at the position of the intersection point P.

Figure 12:
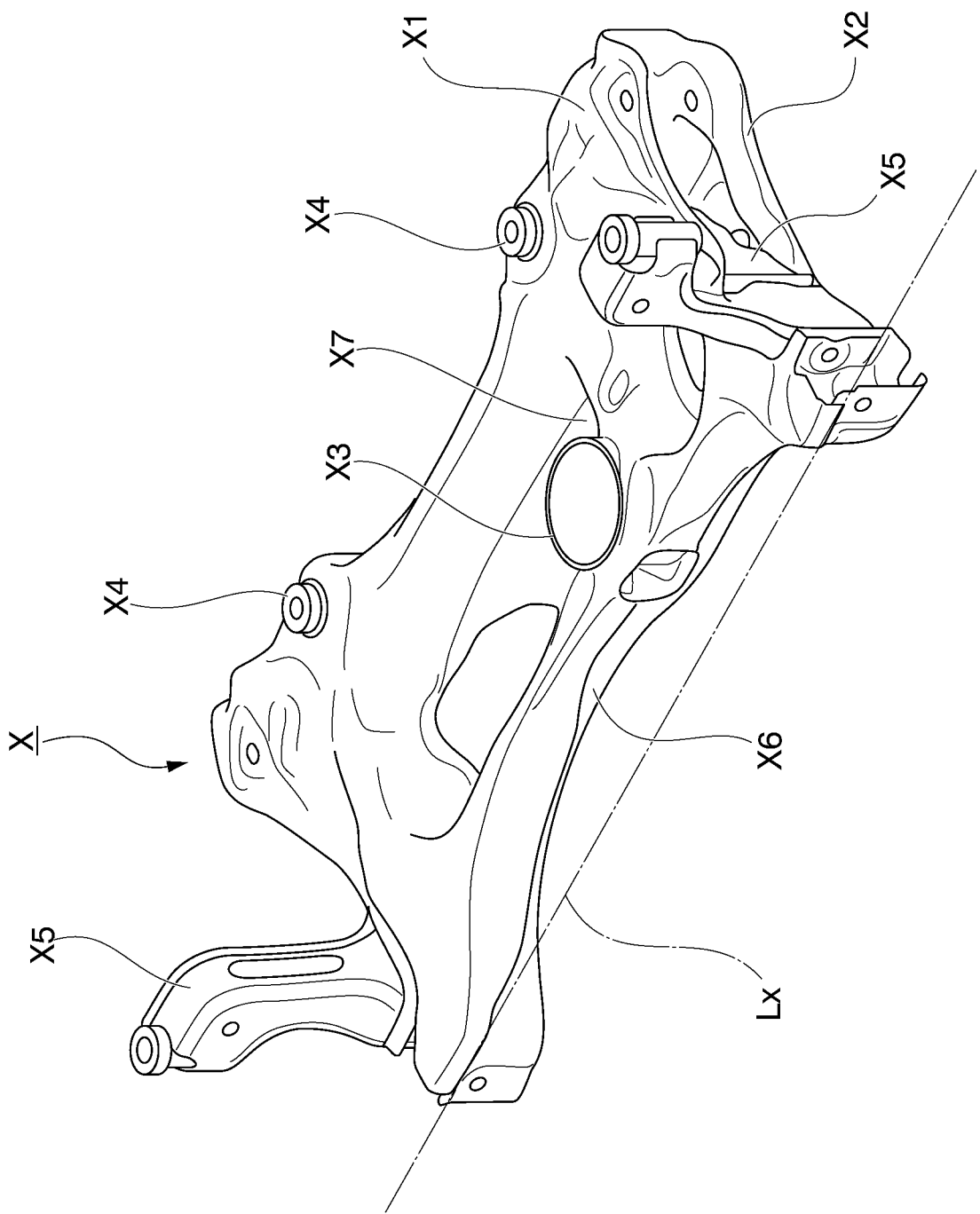
FIG. 12 is a perspective view illustrating a front subframe of comparative example 1.

Comparative example 1 has a structure illustrated in FIG. 12. That is, a subframe of comparative example 1 includes a substantially rectangular frame X in which an upper component X1 and a lower component X2 are overlapped and joined to each other, a collar X3 fixed to the frame X, a pair of rear body mounts X4, and a pair of front body mounts X5. In the frame X, a front cross member part X6 is formed at a position between the pair of front body mounts X5. The collar X3 is disposed at an intermediate position in a longitudinal direction of the front cross member part X6. Then, one connection part X7 connecting the collar X3 and one of the rear body mounts X4 is formed in the frame X.

As illustrated in FIG. 12, in comparative example 1, a central portion of the front cross member part X6 in the longitudinal direction is largely curved to be convex toward the rear. Therefore, a virtual straight line Lx connecting centroids at positions of both ends of the front cross member part X6 in the longitudinal direction is outside the front cross member part X6 at a central portion of the front cross member part X6 in the longitudinal direction. Also, since there is only one connection part X7, an extended line of an axis passing through a centroid at any position in a longitudinal direction thereof does not form an intersection point inside the front cross member part X6.

As a condition at the time of a numerical calculation for each of invention example 1 and comparative example 1, first, four body mounts of both the subframes were completely fixed to the vehicle body. Then, an external force (1 kN) was applied to both ends of the front cross member to which a lower arm is connected and a support point of an engine, and an amount of displacement of an input point of the external force was obtained. Then, a value obtained by dividing the external force applied to the input point by the amount of displacement of the input point was obtained, and this was used as a stiffness evaluation value. Further, the stiffness evaluation value of invention example 1 was divided by the stiffness evaluation value of comparative example 1 to make it dimensionless. Finally, a weight efficiency of stiffness was obtained by dividing the stiffness evaluation value that has been made dimensionless in this way by a ratio by weight (constant value) of invention example 1 to comparative example 1. The results are shown in FIG. 13.

Further, a fastening point of the body mount, a fastening point of the lower arm, and a position of the engine mount, which were other boundary conditions at the time of the numerical calculation, were set as conditions common to invention example 1 and comparative example 1.

Figure 13:
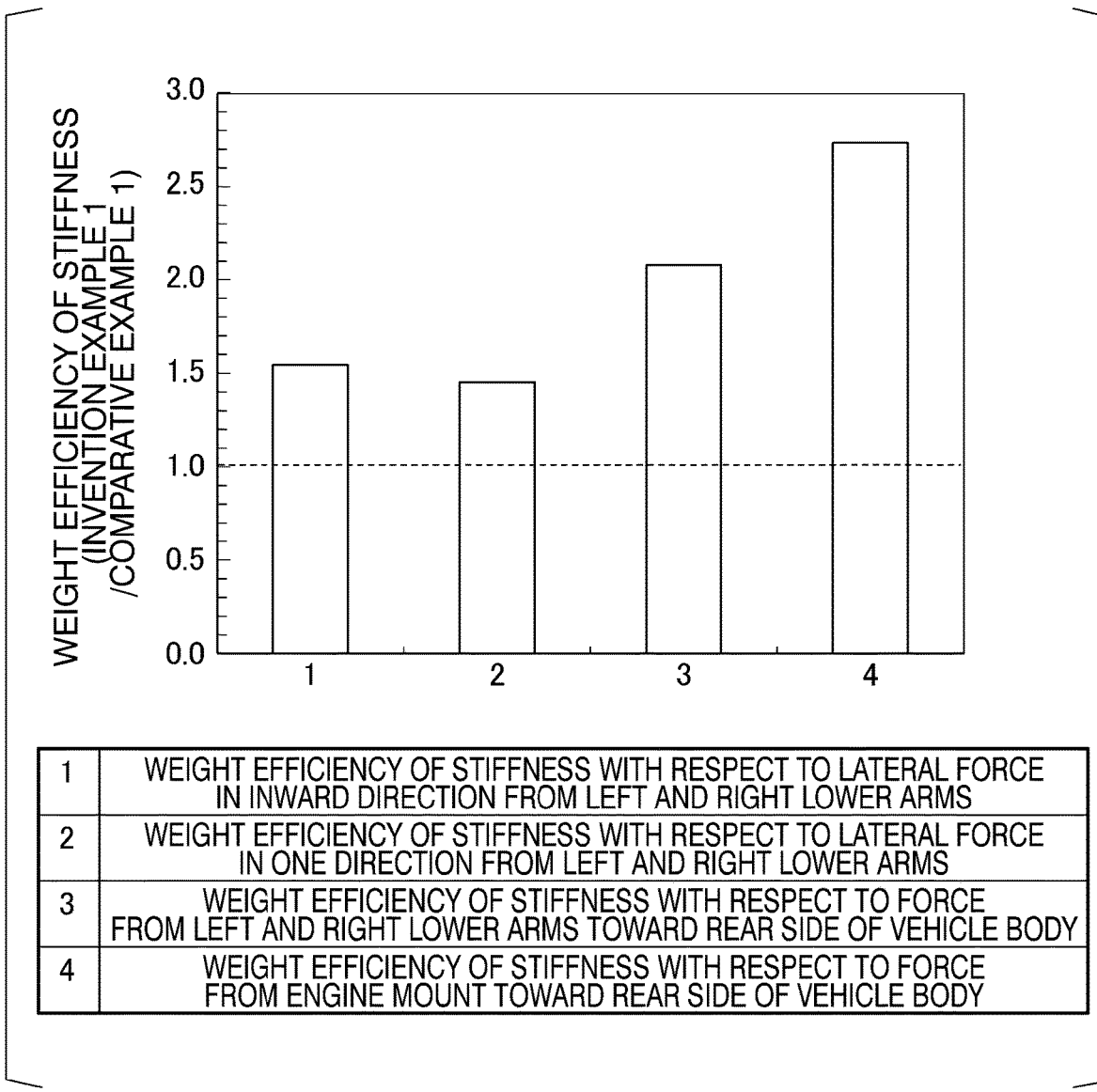
FIG. 13 is a diagram showing a first example of the present invention and is a bar graph obtained by comparing a weight efficiency of stiffness with respect to an external force received from each direction between invention example 1 and comparative example 1.

In FIG. 13, numbers 1 to 4 on the horizontal axis indicate a stiffness ratio of invention example 1 to comparative example 1. Specifically, number 1 on the horizontal axis indicates an analysis result when a lateral force acted on both ends of the front cross member in an inward direction in which a pair of lower arms come close to each other. Also, number 2 on the horizontal axis indicates an analysis result when the lateral force acted on both ends of the front cross member in one direction from one end to the other end of both ends. Also, number 3 on the horizontal axis indicates an analysis result when a longitudinal force toward the rear side of the vehicle body acted on both ends of the front cross member. Also, number 4 on the horizontal axis indicates an analysis result when the longitudinal force toward the rear side of the vehicle body acted on a center of the collar disposed in the front cross member.

As illustrated in FIG. 13, it was shown that the weight efficiency of stiffness of invention example 1 was higher than that of comparative example 1 by more than 1.0 in any of numbers 1 to 4 on the horizontal axis.

In invention example 1, since the structure receives a load not as a bending load of the skeleton member but as a tensile load or a compressive load, decrease in stiffness is suppressed even when the skeleton member is made thinner. Therefore, the weight efficiency of stiffness is higher than that of comparative example 1 that is made of a thick member.

As described above, it was confirmed that weight reduction was achieved while securing stiffness in invention example 1.

Example 2

Figure 14A:
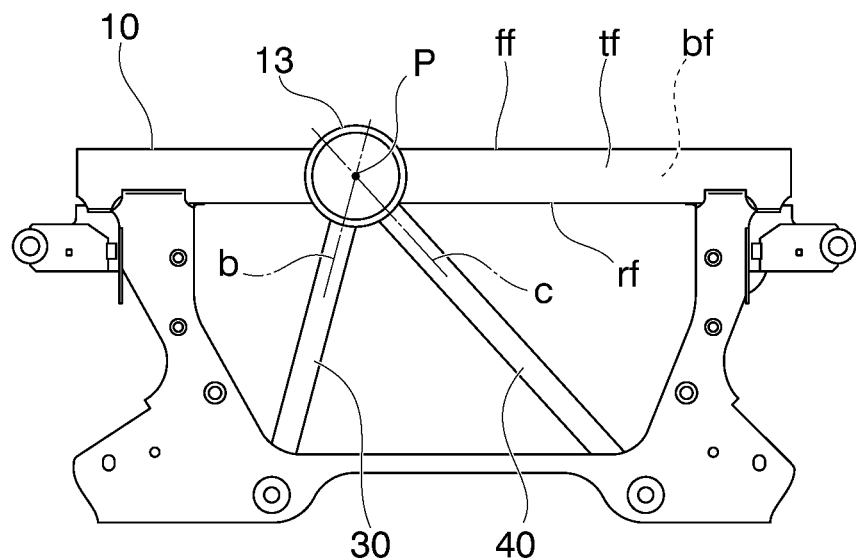
FIG. 14A is a plan view of a front subframe according to invention example 2.
Figure 14B:
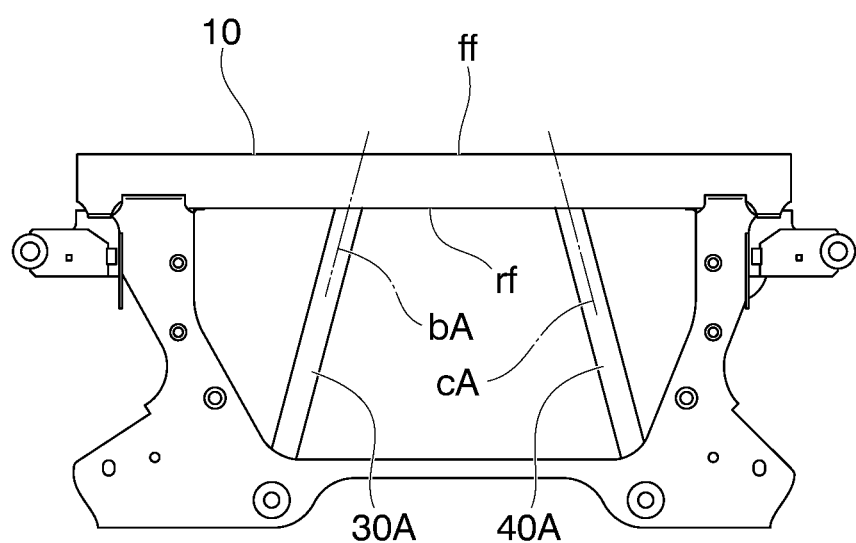
FIG. 14B is a plan view illustrating comparative example 2 of a front subframe.
Figure 14C:
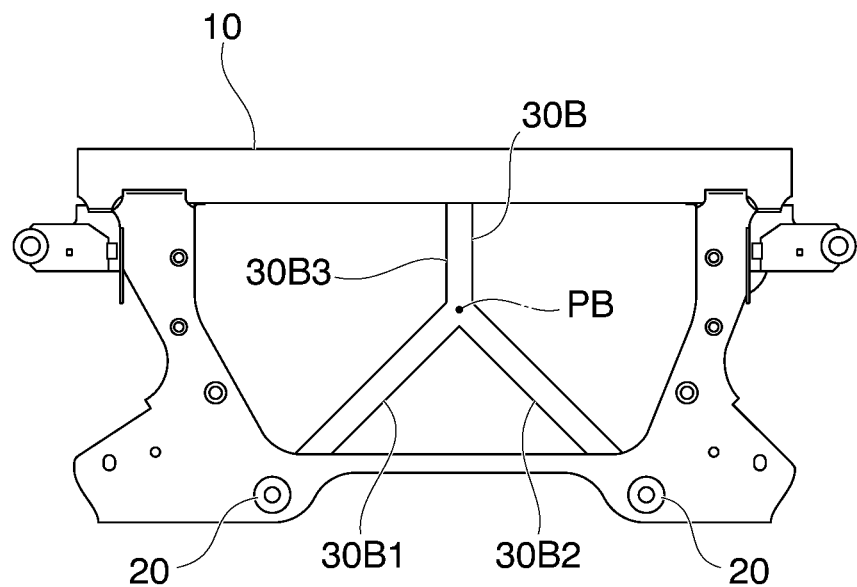
FIG. 14C is a plan view illustrating comparative example 3 of a front subframe.
Figure 14D:
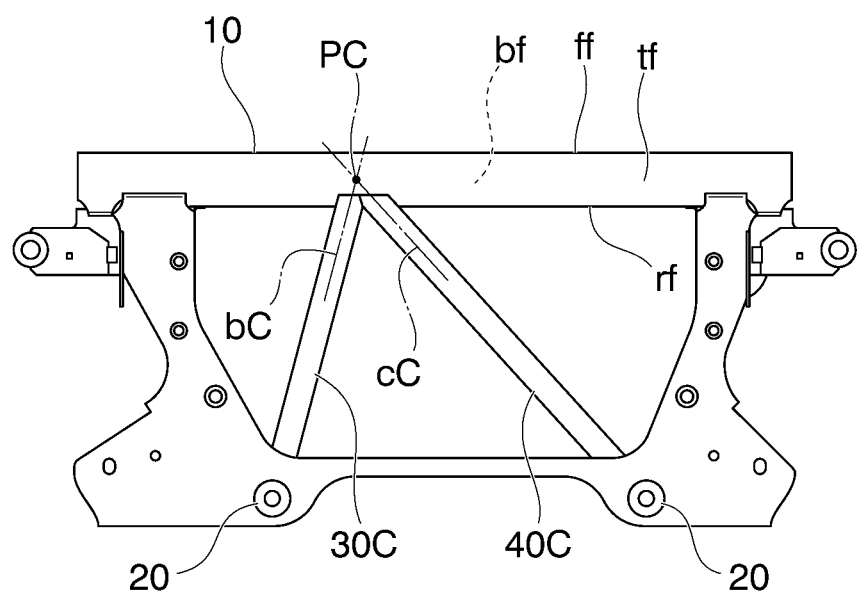
FIG. 14D is a plan view illustrating comparative example 4 of a front subframe.

Next, in order to confirm effects on a stiffness of a support structure by the connection members 30 and 40 of invention example 2 (FIG. 14A), calculation models illustrated in FIGS. 14B to 14D were also prepared, and stiffness strength when a common external force was applied to each of them were compared.

First, as a description for each calculation model, FIG. 14A is a plan view of a front subframe according to invention example 2 described above. Invention example 2 has the same configuration as the front subframe illustrated in FIG. 1.

FIG. 14B is comparative example 2 in which connection members 30A and 40A are employed instead of the connection members 30 and 40 illustrated in FIG. 14A. These connection members 30A and 40A have the same outer diameter dimension and inner diameter dimension as the connection members 30 and 40, but they are joined to a rear side surface of the front cross member 10 in a state of being spaced apart from each other in the left-right direction. Therefore, in comparative example 2, a first axis bA passing through a centroid at any position in a longitudinal direction of the connection member 30A and a second axis cA passing through a centroid at any position in a longitudinal direction of the connection member 40A do not intersect to form an intersection point P within a range between the front surface ff and the rear surface rf of the front cross member 10 in a plan view.

FIG. 14C employs an inverted Y-shaped connection member 30B instead of the connection members 30 and 40 illustrated in FIG. 14A. The connection member 30B includes a first member 30B1, a second member 30B2, and a third member 30B3 having the same outer diameter dimension and inner diameter dimension as the connection members 30 and 40. One end side of the first member 30B1 and the second member 30B2 are joined to the rear body mounts 20, and the other ends thereof are joined to each other at an intersection point PB. Further, the third member 30B3 connects the intersection point PB and the rear side surface of the front cross member 10. Therefore, in comparative example 3, the intersection point PB of the first member 30B1 and the second member 30B2 is not within a range between the front surface ff and the rear surface rf of the front cross member 10 in a plan view.

FIG. 14D employs connection members 30C and 40C instead of the connection members 30 and 40 illustrated in FIG. 14A. One end side of the connection members 30C and 40C are joined to the rear body mounts 20, and the other ends thereof are joined not to the rear side surface of the front cross member 10 but to the top surface tf. Then, a first axis bC passing through a centroid at any position in the longitudinal direction of the connection member 30C and a second axis cC passing through a centroid at any position in the longitudinal direction of the connection member 40C intersect at an intersection point PC within a range between the front surface ff and the rear surface rf of the front cross member 10 in a plan view. However, the intersection point PC is not within a range between the top surface tf and the lower surface bf of the front cross member 10 in a side view (longitudinal sectional view).

Stiffness when an external force was applied to each of invention example 2 and comparative examples 2 to 4 having the above-described configurations was evaluated by a numerical calculation.

As a condition at the time of the numerical calculation, first, the four body mounts (the rear body mounts 20 and the front body mounts 60) of each subframe were completely fixed to the vehicle body. Then, an external force (1 kN) acting as a lateral force was applied to both ends of the front cross member 10 to which lower arms are connected, and an amount of displacement of an input point of the external force was obtained. Then, a value obtained by dividing the external force applied to the input point by the amount of displacement of the input point was obtained, and this was used as a stiffness evaluation value. Further, each stiffness evaluation value of invention example 2 and comparative examples 2 to 4 was divided by the stiffness evaluation value of invention example 2 to make it dimensionless. The results obtained in this way are shown in FIGS. 15 and 16.

Further, a fastening point of the body mount and a fastening point of the lower arm, which were other conditions at the time of the numerical calculation, were set as conditions common to invention example 2 and comparative examples 2 to 4.

Figure 15:
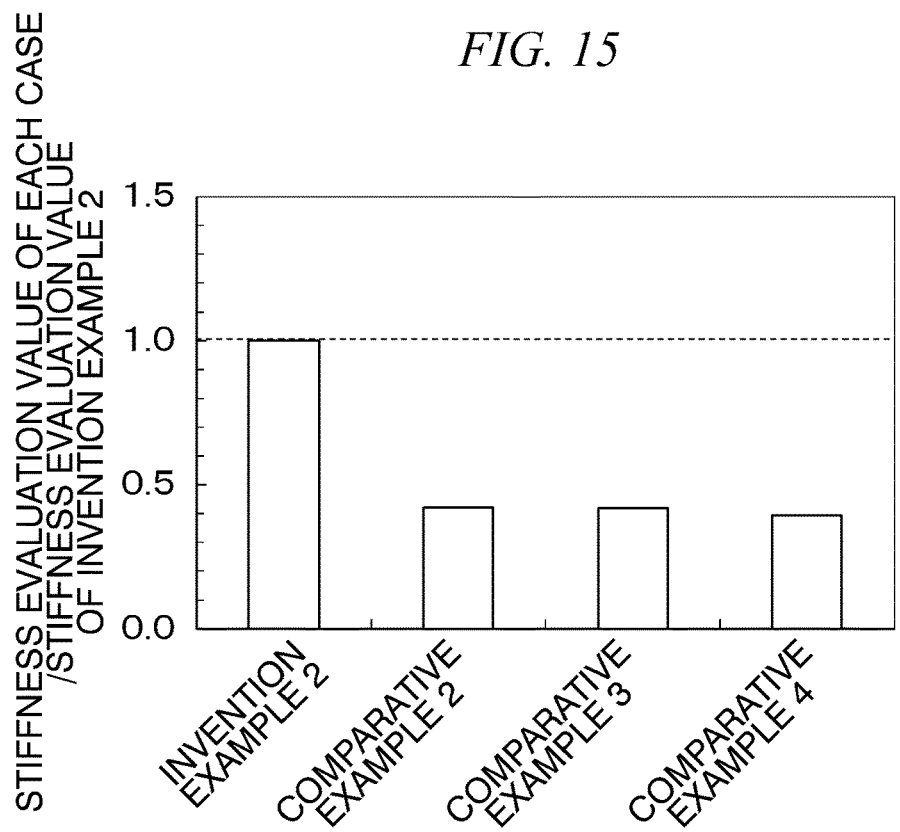
FIG. 15 is a bar graph comparing stiffness of each front subframe illustrated in invention example 2 and comparative examples 2 to 4 when an inward lateral force is applied.

FIG. 15 shows an analysis result when a lateral force acted on both ends of the front cross member 10 in an inward direction in which a pair of lower arms come close to each other. As can be found from this analysis result, it was confirmed that the stiffness of invention example 2 was more than twice as high as the stiffness in comparative examples 2 to 4.

Figure 16:
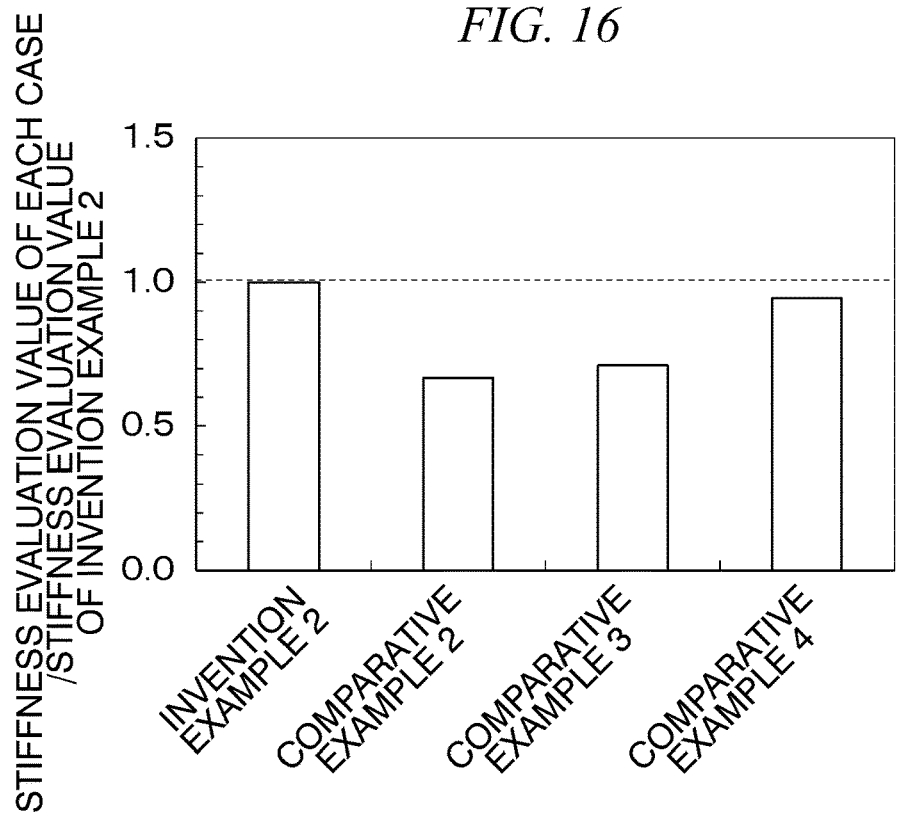
FIG. 16 is a bar graph comparing stiffness of each front subframe illustrated in invention example 2 and comparative examples 2 to 4 when a lateral force in one direction is applied.

FIG. 16 shows an analysis result when a lateral force acted on both ends of the front cross member 10 in one direction from one end to the other end of both ends. As can be found from this analysis result, it was confirmed that the stiffness of invention example 2 was higher than that of any of comparative examples 2 to 4.

Further, a case in which a longitudinal force was applied to the front cross member 10 instead of the lateral force was also evaluated, but there was no difference between invention example 2 and comparative examples 2 to 4. Therefore, it was confirmed that a position of the intersection point P was extremely important for increasing stiffness against a lateral force.

Example 3

In the front subframe illustrated in FIG. 1, the stiffness of the front cross member 10 tends to improve when a sheet thickness of the engine mount 13 is increased. On the other hand, when the sheet thickness is increased too much, the weight of the engine mount 13 increases, and as a result, a weight efficiency of stiffness tends to decrease. Therefore, there is a preferable sheet thickness ratio from the perspective of the weight efficiency of stiffness.

Therefore, in the front subframe illustrated in FIG. 1, a ratio of a minimum sheet thickness $t_C$ (mm) of the engine mount 13 to an average sheet thickness $t_F$ (mm) of the straight parts 11c and 12c was set to $t_C/t_F$, and how the weight efficiency of stiffness was displaced was obtained by a numerical calculation.

As a condition at the time of the numerical calculation, first, the front subframe illustrated in FIG. 1 was fixed to the vehicle body at four points including the pair of rear body mounts 20 and the pair of front body mounts 60. Then, the ratio $t_C/t_F$ was changed between 1 and 10, and a stiffness value and a mass were obtained for each ratio $t_C/t_F$. Then, a relationship between the ratio $t_C/t_F$ and the weight efficiency of stiffness (stiffness/mass K/M) was summarized in the graph shown in FIG. 17A. Also, a slope of the weight efficiency (stiffness/mass K/M) of stiffness of the curve in FIG. 17A at each ratio $t_C/t_F$ was obtained and summarized in FIG. 17B.

Figure 17A:
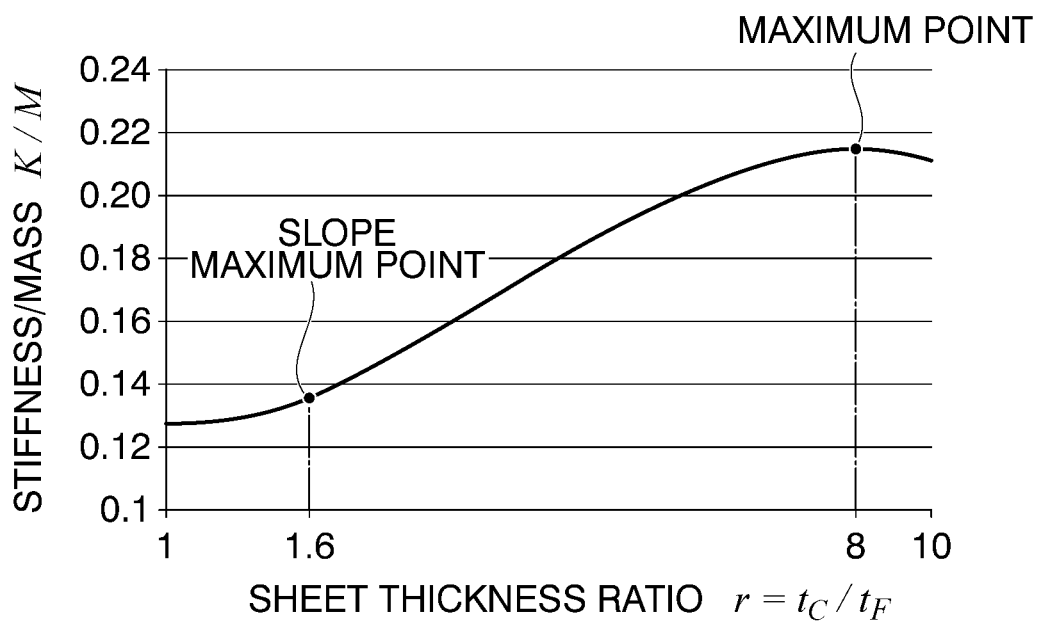
FIG. 17A is a diagram showing a third example of the present invention, and is a graph showing change in weight efficiency of stiffness when a sheet thickness ratio obtained by dividing a minimum sheet thickness of an engine mount 13 by an average sheet thickness of a front cross member 10 of the front subframe illustrated in FIG. 1 was changed.
Figure 17B:
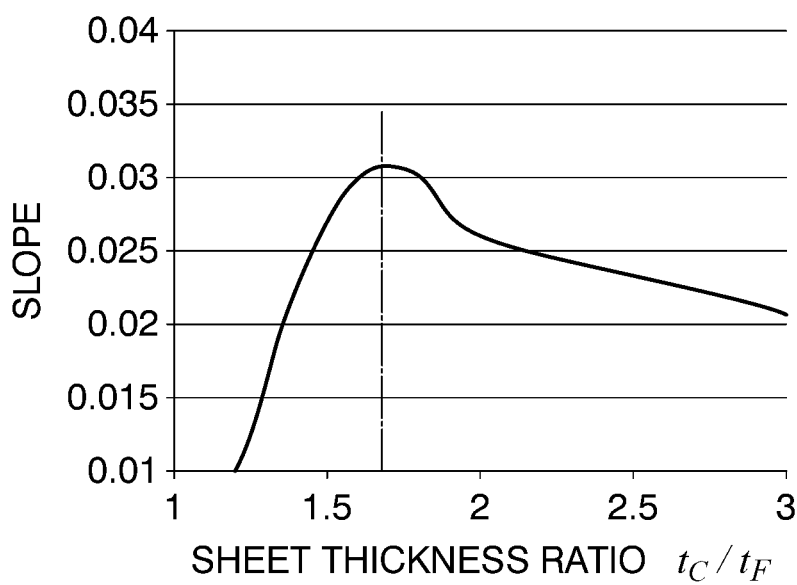
FIG. 17B is a graph showing change in slope of "stiffness/mass K/M" in FIG. 17A according to the sheet thickness ratio.

As is apparent from FIG. 17B, the slope rises sharply in accordance with increase in the ratio $t_C/t_F$, reaches a maximum value when the ratio $t_C/t_F$ reaches 1.6, and then gradually decreases.

From this, it has been found that 1.6 or more is preferably employed as the ratio $t_C/t_F$ at which the slope is maximum in the curve shown in FIG. 17A. More desirably, the ratio $t_C/t_F$ is preferably 3 or more in which 80% or more of the maximum value of the weight efficiency can be achieved. On the other hand, as an upper limit of the ratio $t_C/t_F$, it is more preferable to employ 8.0 at which the weight efficiency has the maximum value in FIG. 17A.

From the above-described results, it has been ascertained that the minimum sheet thickness of the engine mount 13 at the connection positions with respect to the part members 11 and 12 is preferably 1.6 times or more the average sheet thickness at the connection ends of the part members 11 and 12 with respect to the engine mount 13.

Example 4

In example 3, a case in which the reinforcing part (engine mount 13) has a cylindrical shape has been described, but the same tendency as in example 3 can be obtained even when a reinforcing part having a shape other than the cylindrical shape is employed. In regard to this, a box-shaped reinforcing part 113 illustrated in FIG. 18 will be described as an example.

The box-shaped reinforcing part 113 has substantially a cubic shape, and only a front surface of six surfaces is open. Then, the part member 11 is abutted and connected to one of a pair of side walls on both sides of the opening. Also, the part member 12 is abutted and connected to the other of the pair of side walls. Further, the connection members 30 and 40 are abutted and connected to a back surface of the reinforcing part 113 facing the opening. A relative positional relationship between the part members 11 and 12 and the connection members 30 and 40 with the reinforcing part 113 as a center is the same as the relative positional relationship between the part members 11 and 12 and the connection members 30 and 40 with the engine mount 13 described with reference to FIG. 1 as a center. Also, the other configurations are the same as those of the subframe illustrated in FIG. 1.

A minimum sheet thickness of the reinforcing part 113 at a connection position 113a1 with respect to the part member 11 is 1.6 times or more an average sheet thickness of the part member 11 joined thereto. Similarly, a minimum sheet thickness of the reinforcing part 113 at a connection position with respect to the part member 12 is also 1.6 times or more an average sheet thickness of the part member 12 joined thereto.

Figure 18:
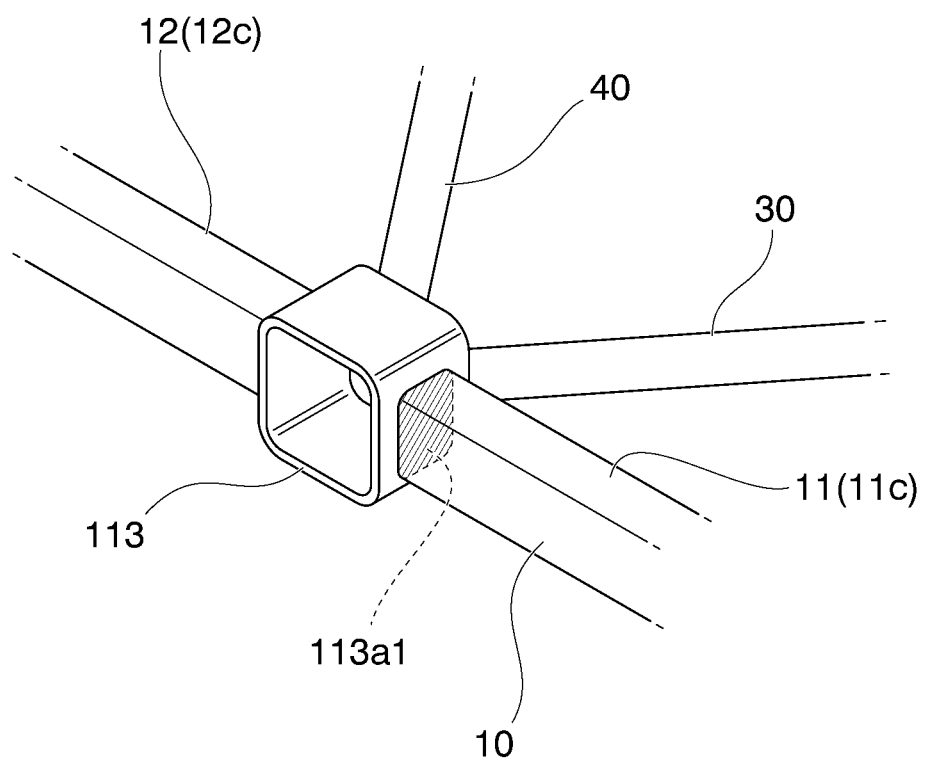
FIG. 18 is a view illustrating a fourth example of the present invention and is a partial perspective view illustrating a case in which a box-shaped reinforcing part 113 is used instead of the engine mount 13 in the front subframe illustrated in FIG. 1.

Also in the front subframe illustrated in FIG. 18, the stiffness of the front cross member 10 tends to improve when the sheet thickness of the reinforcing part 113 is increased. On the other hand, when the sheet thickness is increased too much, the weight of the reinforcing part 113 increases, and as a result, the weight efficiency of the stiffness tends to decrease. Therefore, there is a preferable sheet thickness ratio from the perspective of a weight efficiency of stiffness.

Therefore, in the front subframe illustrated in FIG. 18, a ratio of a minimum sheet thickness $t_C$ (mm) of the reinforcing part 113 to an average sheet thickness $t_F$ (mm) of the straight parts 11c and 12c was set to $t_C/t_F$, and how the weight efficiency of stiffness was displaced was obtained by a numerical calculation.

As a condition at the time of the numerical calculation, first, the front subframe illustrated in FIG. 18 was fixed to the vehicle body at four points including the pair of rear body mounts 20 and the pair of front body mounts 60 illustrated in FIG. 1. Then, the ratio $t_C/t_F$ was changed between 1 and 10, and a stiffness value and a mass were obtained for each ratio $t_C/t_F$. Then, a relationship between the ratio $t_C/t_F$ and the weight efficiency of stiffness (stiffness/mass K/M) was summarized in the graph shown in FIG. 19A. Also, a slope of the weight efficiency (stiffness/mass K/M) of stiffness of the curve in FIG. 19A at each ratio $t_C/t_F$ was obtained and summarized in FIG. 19B.

Figure 19A:
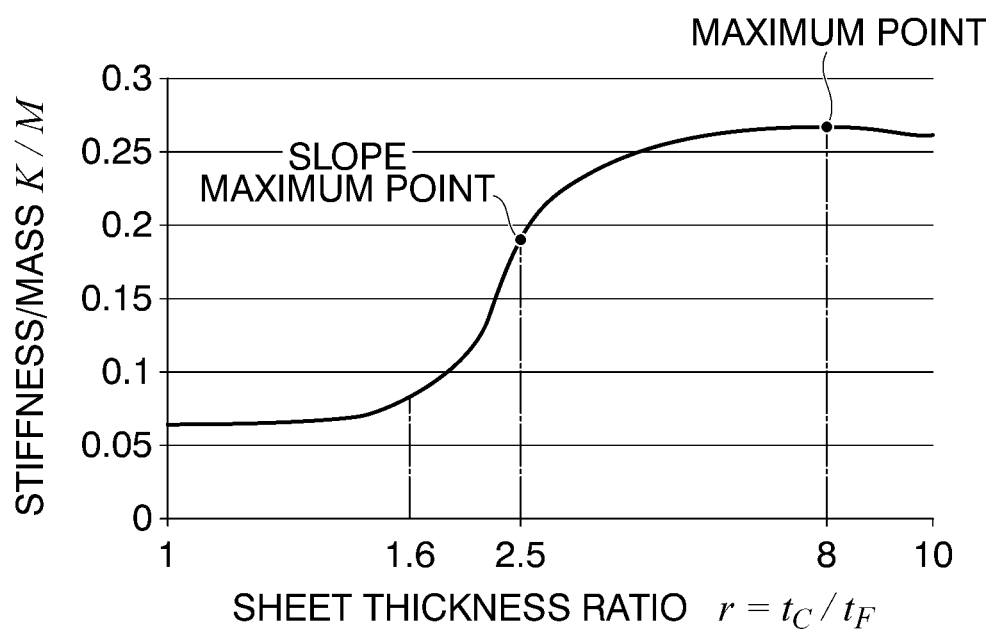
FIG. 19A is a graph showing change in weight efficiency of stiffness when a sheet thickness ratio obtained by dividing a minimum sheet thickness of the reinforcing part 113 by an average sheet thickness of the front cross member 10 of the front subframe illustrated in FIG. 18 was changed.
Figure 19B:
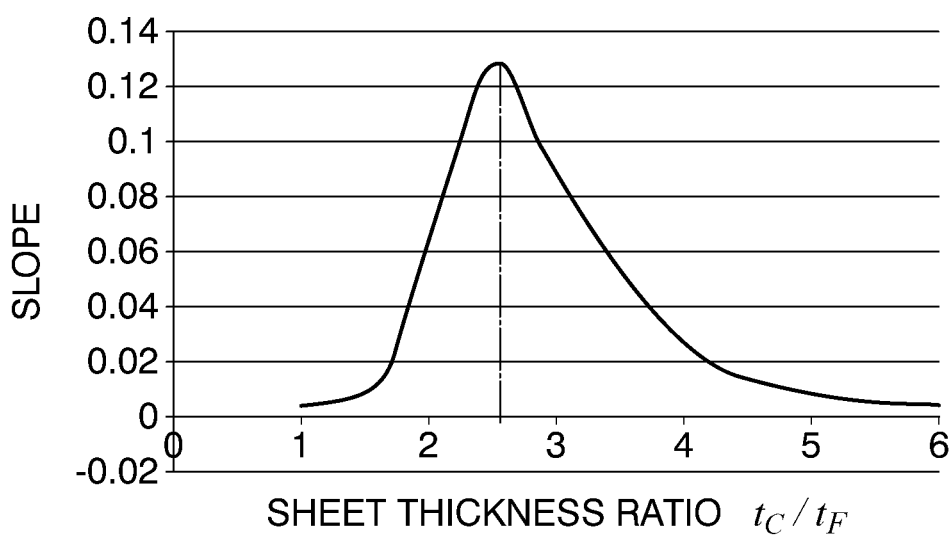
FIG. 19B is a graph showing change in slope of "stiffness/mass K/M" in FIG. 19A according to the sheet thickness ratio.

As is apparent from FIG. 19B, the slope is maximum when the ratio $t_C/t_F$ is 2.5 after passing 1.6, reaches a maximum value when the ratio $t_C/t_F$ reaches 8.0, and gradually decreases thereafter.

From this, it has been found that 1.6 or more is preferably employed and 2.5 or more is more preferably employed as the ratio $t_C/t_F$ at which the slope is maximum in the curve shown in FIG. 19A. On the other hand, as an upper limit of the ratio $t_C/t_F$, it is more preferable to employ 8.0 at which the weight efficiency has the maximum value in FIG. 19A.

From the above-described results, it has been ascertained that the minimum sheet thickness of the box-shaped reinforcing part 113 at the connection positions with respect to the part members 11 and 12 is preferably 1.6 times or more and more preferably 2.5 times more the average sheet thickness at the connection ends of the part members 11 and 12 with respect to the reinforcing part 113.

Although one embodiment and examples of the present invention have been described above, the content of the present invention is not limited only thereto.

For example, in the above-described embodiment illustrated in FIG. 1, a case in which the engine mount 13 (bush collar) is used as the reinforcing part has been described as an example, but instead of the engine mount 13, any of a rack gear mount, a body mount, a differential gear mount, a motor mount, and a battery mount may be employed. Also in these cases, a sheet thickness of each of the above-described mounts is preferably 1.6 times or more an average sheet thickness at a connection end of a part member.

INDUSTRIAL APPLICABILITY

According to the present invention, a lower vehicle body structure that is lightweight and has high stiffness and a high load transmission efficiency can be provided. Therefore, industrial applicability is high.

BRIEF DESCRIPTION OF THE REFERENCE SYMBOLS

10 Front cross member (cross member)
11 First part member (part cross member)
11a Left end (both end)
11c, 12c Straight part (connection end)
12 Second part member (part cross member)
12a Right end (both end)
13 Engine mount (reinforcing part)
13a1 First wall surface
13a2 Second wall surface
20 Rear body mount (body mount)
30 Connection member (first connection member)
32 Extension piece (first extension piece)
40 Connection member (second connection member)
42 Extension piece (second extension piece)
b First axis
b1 Extended line
c Second axis
c1 Extended line
EX Virtual straight line
P Intersection point (intersecting position)

The invention claimed is:

1. A lower vehicle body structure comprising:
suspension components;
a cross member including a pair of part cross members connected to the suspension components and a reinforcing part coaxially connected between the pair of part cross members;
a plurality of body mounts; and
a plurality of connection members directly connecting each of the plurality of body mounts and the reinforcing part, wherein
a minimum sheet thickness of the reinforcing part at connection positions with respect to the pair of part cross members is 1.6 times or more an average sheet thickness at connection ends of the pair of part cross members with respect to the reinforcing part, wherein:
the connection end at one of the pair of part cross members is abutted and connected to a first wall surface of the reinforcing part;
the connection end at the other of the pair of part cross members is abutted and connected to a second wall surface of the reinforcing part; and
one of the part cross members, the first wall surface, the second wall surface, and the other of the part cross members are coaxially aligned in that order in a longitudinal direction of the cross member.

2. The lower vehicle body structure according to claim 1, wherein:
the plurality of connection members include a first connection member and a second connection member; and,
in a longitudinal section perpendicular to the longitudinal direction of the cross member, which includes a position where
an extended line of a first axis passing through a centroid of an outer shape of the first connection member at any position in a longitudinal direction in a cross section perpendicular to the longitudinal direction, and
an extended line of a second axis passing through a centroid of an outer shape of the second connection member at any position in a longitudinal direction intersect in a plan view,
both the extended line of the first axis and the extended line of the second axis are inside the reinforcing part.

3. The lower vehicle body structure according to claim 2, wherein
the extended line of the first axis and the extended line of the second axis coincide with each other at one point in the reinforcing part in a view of the longitudinal section.

4. The lower vehicle body structure according to claim 3, wherein
both the extended line of the first axis and the extended line of the second axis are inside a projected outer shape of the connection end of each of the pair of part cross members in a view of the longitudinal section.

5. The lower vehicle body structure according to claim 2, wherein
the first connection member is joined to one of the body mounts via a first extension piece extending from an end portion of the first connection member.

6. The lower vehicle body structure according to claim 2, wherein
the second connection member is joined to another of the body mounts via a second extension piece extending from an end portion of the second connection member.

7. The lower vehicle body structure according to claim 1, wherein
the reinforcing part is a rack gear mount, another body mount, a differential gear mount, a motor mount, a battery mount, or any combination thereof.

8. The lower vehicle body structure according to claim 7, wherein:
the reinforcing part is any one of the rack gear mount, the body mount, the differential gear mount, the motor mount, and the battery mount, each of which having a cylindrical shape; and
the pair of part cross members and the plurality of connection members are abutted and connected to an outer circumferential surface of the reinforcing part.

9. The lower vehicle body structure according to claim 1, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

10. The lower vehicle body structure according to claim 1, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

11. The lower vehicle body structure according to claim 2, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

12. The lower vehicle body structure according to claim 3, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

13. The lower vehicle body structure according to claim 4, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

14. The lower vehicle body structure according to claim 5, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

15. The lower vehicle body structure according to claim 6, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

16. The lower vehicle body structure according to claim 7, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

17. The lower vehicle body structure according to claim 8, wherein
a virtual straight line connecting centroids of outer shapes in a cross section perpendicular to the longitudinal direction of the cross member at positions of both ends of the cross member passes through the inside of the cross member at any position in the longitudinal direction of the cross member.

18. The lower vehicle body structure according to claim 1, wherein:
each of the part cross members is a hollow member or a member having a U-shape.

* * * * *